United States Patent
Lee et al.

(10) Patent No.: US 9,921,697 B2
(45) Date of Patent: *Mar. 20, 2018

(54) TOUCH SENSOR DEVICE AND MANUFACTURING METHOD THEREOF

(71) Applicant: Samsung Display Co., Ltd., Yongin-si (KR)

(72) Inventors: Byeong-Jin Lee, Suwon-si (KR); Sung Ku Kang, Suwon-si (KR); Jung-Yun Kim, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 86 days.

This patent is subject to a terminal disclaimer.

(21) Appl. No.: 14/886,562

(22) Filed: Oct. 19, 2015

(65) Prior Publication Data

US 2016/0320872 A1    Nov. 3, 2016

(30) Foreign Application Priority Data

Apr. 30, 2015 (KR) ........................ 10-2015-0062036

(51) Int. Cl.
*G06F 3/041* (2006.01)
*G06F 3/044* (2006.01)

(52) U.S. Cl.
CPC .... *G06F 3/044* (2013.01); *G06F 2203/04102* (2013.01); *G06F 2203/04103* (2013.01); *G06F 2203/04111* (2013.01)

(58) Field of Classification Search
CPC ...................... G06F 3/041; G06F 3/044; G06F 2203/04102; G06F 2203/04103; G06F 2203/04111

USPC ..................... 345/156–184; 156/150; 257/40
See application file for complete search history.

(56) References Cited

U.S. PATENT DOCUMENTS

| | | | | |
|---|---|---|---|---|
| 5,427,841 A * | 6/1995 | De Leeuw | ........... | C08G 61/126 428/209 |
| 5,620,800 A * | 4/1997 | De Leeuw | ........... | C08G 61/126 156/150 |
| 5,738,934 A | 4/1998 | Jones | | |
| 2003/0013220 A1* | 1/2003 | Lupo | ................... | H01L 27/3244 438/29 |
| 2004/0142271 A1* | 7/2004 | Stulc | .................. | G03G 15/1645 430/125.32 |
| 2006/0274049 A1* | 12/2006 | Spath | ..................... | B82Y 10/00 345/173 |
| 2006/0276034 A1* | 12/2006 | Blanchard | ......... | H01L 21/76802 438/672 |

(Continued)

FOREIGN PATENT DOCUMENTS

JP      2009302013      12/2009
KR    1020120135733    12/2012

(Continued)

*Primary Examiner* — Prabodh M Dharia
(74) *Attorney, Agent, or Firm* — H.C. Park & Associates, PLC

(57) ABSTRACT

A touch sensor device including a first conductive pattern disposed on a substrate and a first polymer layer disposed on the first conductive pattern. The first polymer layer includes a first conductive region and a first non-conductive region. The touch sensor device also includes a second polymer layer disposed on the first polymer layer. The second polymer layer includes a second conductive region and a second non-conductive region.

20 Claims, 30 Drawing Sheets

(56) References Cited

U.S. PATENT DOCUMENTS

| | | | | |
|---|---|---|---|---|
| 2009/0148722 | A1* | 6/2009 | Louwet | C08L 65/00 428/690 |
| 2010/0117985 | A1* | 5/2010 | Wadia | G06F 3/044 345/174 |
| 2010/0311494 | A1* | 12/2010 | Miller | A63F 1/18 463/22 |
| 2011/0123866 | A1* | 5/2011 | Pan | H01M 2/16 429/221 |
| 2011/0196347 | A1* | 8/2011 | Atansoska | A61M 5/142 604/890.1 |
| 2011/0226069 | A1* | 9/2011 | Kim | G01L 1/2293 73/862.045 |
| 2013/0147472 | A1* | 6/2013 | French | G01R 33/032 324/252 |
| 2013/0254465 | A1* | 9/2013 | Asnaashari | G06F 12/0246 711/103 |
| 2013/0312809 | A1* | 11/2013 | Luch | H01L 31/05 136/244 |
| 2014/0085317 | A1* | 3/2014 | Lavery | B81B 7/0006 345/501 |
| 2014/0138133 | A1 | 5/2014 | Byun | |
| 2014/0260679 | A1* | 9/2014 | Baker | G01L 1/16 73/862.68 |
| 2014/0299365 | A1* | 10/2014 | Sebastian | G06F 3/044 174/255 |
| 2015/0227170 | A1* | 8/2015 | Kim | G06F 1/1643 345/174 |
| 2015/0241729 | A1* | 8/2015 | Kim | G02F 1/13452 349/12 |
| 2016/0001496 | A1* | 1/2016 | Chow | G06F 3/044 345/173 |
| 2016/0148861 | A1* | 5/2016 | Liang | H01L 23/49517 257/676 |
| 2016/0202827 | A1* | 7/2016 | Bae | G06F 3/044 345/174 |
| 2016/0204366 | A1* | 7/2016 | Zhang | H01L 23/4985 257/40 |
| 2016/0216827 | A1* | 7/2016 | Lee | G06F 3/044 |
| 2016/0221316 | A1* | 8/2016 | Yairi | B32B 27/40 |
| 2016/0254465 | A1* | 9/2016 | Lin | H01L 27/3244 |
| 2017/0131160 | A1* | 5/2017 | Lu | G01L 1/16 |

FOREIGN PATENT DOCUMENTS

| | | |
|---|---|---|
| KR | 1020130030395 | 3/2013 |
| KR | 1020130126097 | 11/2013 |
| KR | 1020140064069 | 5/2014 |
| KR | 1020140097670 | 8/2014 |

* cited by examiner

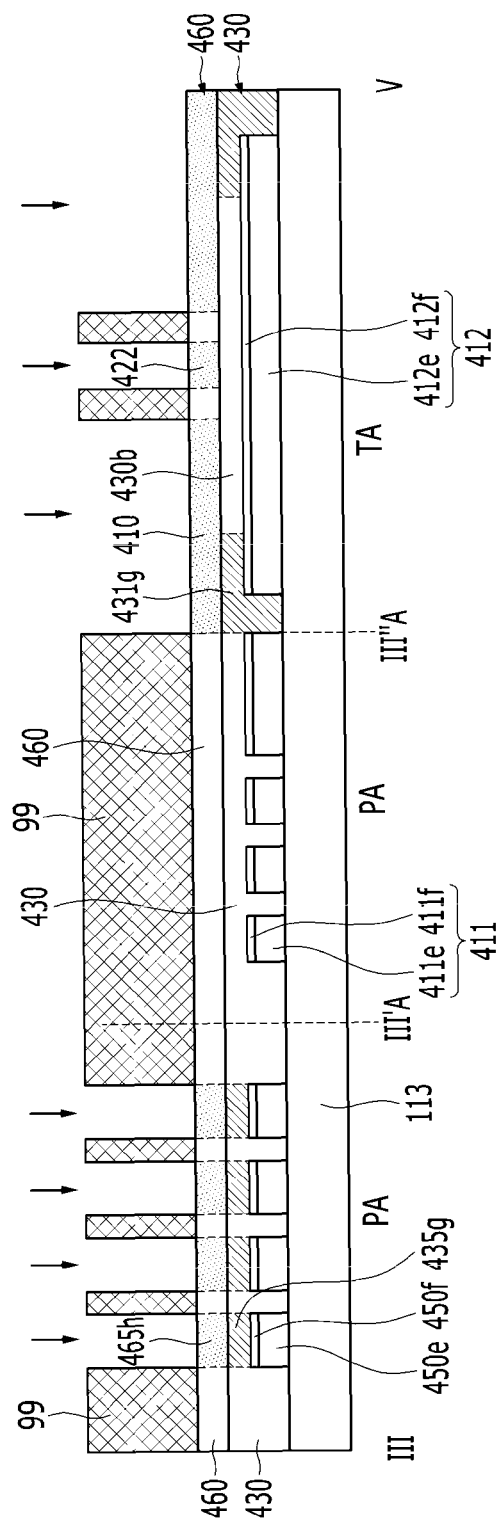

TOUCH SENSOR DEVICE AND MANUFACTURING METHOD THEREOF

CROSS-REFERENCE TO RELATED APPLICATION

This application claims priority from and the benefit of Korean Patent Application No. 10-2015-0062036, filed on Apr. 30, 2015, which is hereby incorporated by reference for all purposes as if fully set forth herein.

BACKGROUND

Field

Exemplary embodiments relate to a touch sensor device and a manufacturing method thereof.

Discussion of the Background

Electronic devices, such as a liquid crystal display (LCD), an organic light emitting diode (OLED) display, and an electrophoretic display may include a touch sensing function that interacts with a user. The touch sensing function senses a change in pressure, charge, or light that are applied to a screen of a display device when an object (i.e. a user's finger or a stylus pen) to a touch surface, thereby determining contact information of the object (i.e., whether the object approached or contacted the touch surface, or the contact position of the object).

The touch sensing functions of several electronic devices may be implemented by a touch sensor. The touch sensor may be classified as a resistive type, a capacitive type, an electro-magnetic type (EM), and an optical type.

The resistive type based touch sensor includes two electrodes spaced apart from each other and may contact each other by a pressure from an external object. When the two electrodes contact each other, the touch sensor may determine the contact positions, by detecting a change in voltage in response to a change in resistance at the contact position.

A capacitive type touch sensor includes a sensing capacitor formed from multiple sensing electrodes capable of transferring a sensing signal. The capacitive touch sensor senses a change in capacitance or a charged state of charge of the sensing capacitor generated when conductors (i.e., an object such as a finger) approach the touch screen or touches the touch screen. If a conductor touches, then the capacitive touch sensor may determine the touched position. The capacitive type touch sensor may include touch electrodes that are disposed in a touch sensing area capable of sensing a touch as well as signal transfer wires that are connected to the touch electrodes. The signal transfer wires may transfer a sensing input signal to the touch electrode or transfer a sensing output signal of the touch electrode that is generated in response to a touch to a sensing signal controller.

The signal transfer wire may generally be positioned in a peripheral area positioned outside a touch sensing area of a touch sensing panel or may be positioned in the touch sensing area.

Various display devices use a heavy and fragile glass substrate. Therefore, these display devices have a limitation in portability and have a large screen display. Using lighter weight materials for the substrate may enhance the portability and flexibility of display devices. However, display devices with touch capabilities have complex manufacturing processing, are still rigid and relatively large due to the touch sensor device within the display devices.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch sensor device and a manufacturing method thereof having advantages of increasing bendability of the touch sensor device.

Exemplary embodiments provide a touch sensor device and a manufacturing method thereof having advantages of simplifying a manufacturing process of a touch sensor device.

Additional aspects will be set forth in the detailed description which follows, and, in part, will be apparent from the disclosure, or may be learned by practice of the inventive concept.

An exemplary embodiment discloses a touch sensor device including a first conductive pattern disposed on a substrate and a first polymer layer disposed on the first conductive pattern. The first polymer layer includes a first conductive region and a first non-conductive region. The touch sensor device also includes a second polymer layer disposed on the first polymer layer. The second polymer layer includes a second conductive region and a second non-conductive region.

An exemplary embodiment also discloses a manufacturing method of a touch sensor device including stacking and patterning a conductive layer on a substrate to form a first conductive pattern, applying a first polymer material on an entire surface of the first conductive pattern to form a first polymer layer, disposing a first mask pattern on a portion of the first polymer layer, oxidizing the portion of the first polymer layer not covered by the first mask pattern to form a first non-conductive region in the portion of the first polymer layer not covered by the first mask pattern and a first conductive region in the portion covered by the first mask pattern, applying a second polymer material on an entire surface of the first polymer layer to form a second polymer layer, and disposing a second mask pattern on a portion of the second polymer layer, and oxidizing the portion of the second polymer layer not covered by the second mask pattern to form a second non-conductive region in the portion of the second polymer layer not covered by the second mask pattern and a second conductive region covered by the second mask pattern.

According to an exemplary embodiment of the present invention, it is possible to increase the bendability of the touch sensor device and simplify the manufacturing process of the touch sensor device.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIGS. 24, 25, 26, 27, 28, 29, and 30 are cross-sectional views an intermediate product manufactured by the manufacturing method of a touch sensor according to the exemplary embodiment sequentially illustrated according to a process order by taken along the section line corresponding to the III-III'A-III"A-V illustrated in FIGS. 1 and 2.

DETAILED DESCRIPTION OF THE ILLUSTRATED EMBODIMENTS

Figure 1:
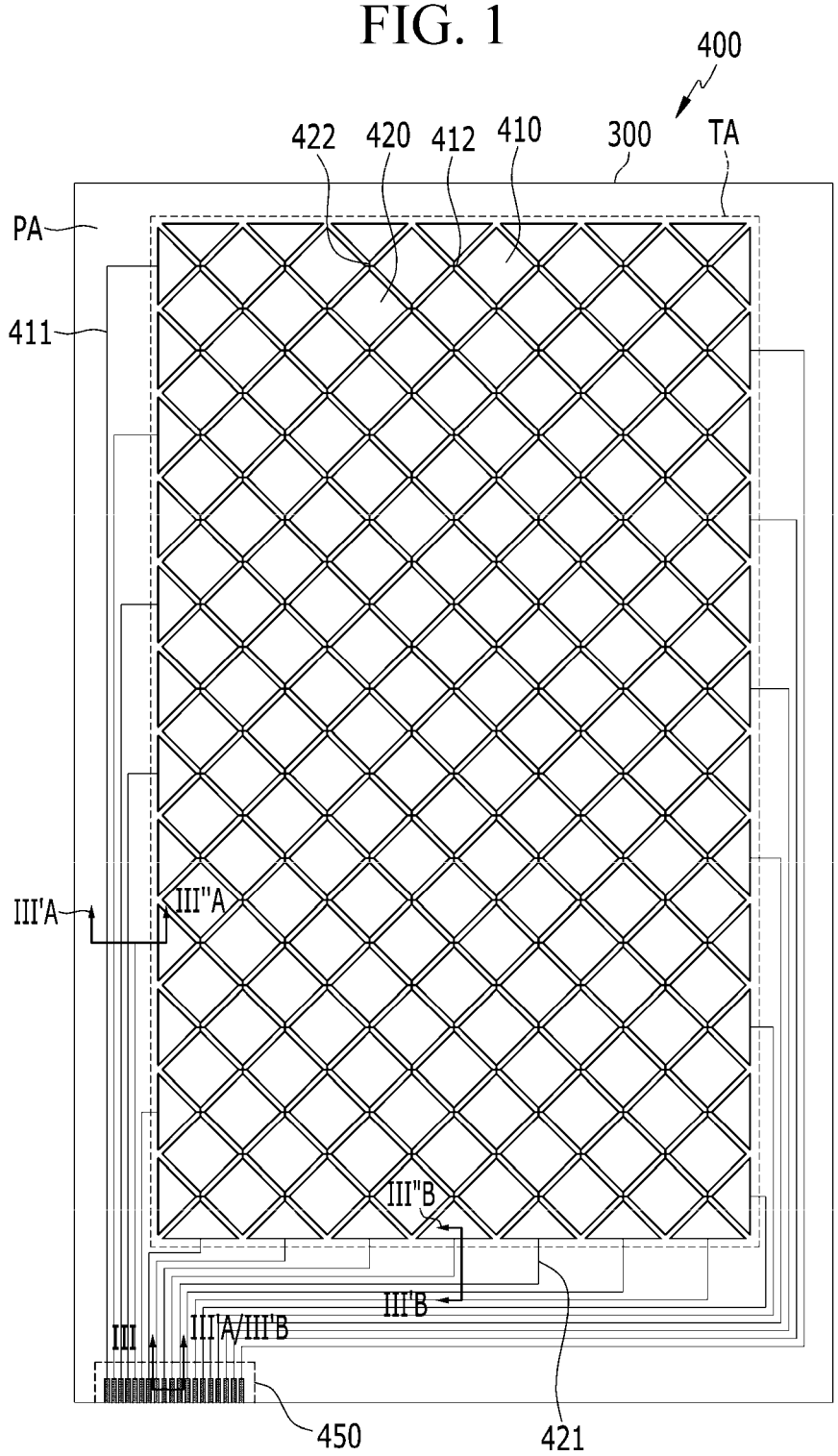
FIG. 1 is a plan view of a touch sensor device including a touch sensor according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

For an electronic device with touch capabilities to benefit from the flexibility of the plastic substrate, a touch sensor imbedded or attached to the flexible electronic device also needs to be flexible. Thus, a flexible touch sensor needs to be foldable (bendable), rollable, or stretchable properties in at least one direction. In addition, a flexible touch sensor needs to have elasticity such that the flexible touch sensor may have a deformed portion. The flexible touch sensor needs to include a multiple touch electrodes having flexibility to prevent defects from occurring even after the touch electrode is deformed.

Various materials such as metal nano wire (i.e., silver nano wire (AgNW)), carbon nanotube (CNT), graphene, metal mesh, and conductive polymer are potential materials for enhancing flexibility of a touch sensor.

Referring to FIG. 1, a touch sensor device 400 according to an exemplary embodiment includes a touch sensing area TA capable of sensing a touch and a peripheral area PA positioned outside the touch sensing area TA. A plurality of touch sensors are positioned in the touch sensing area TA. The touch sensor may sense a touch by various methods. For example, the touch sensor may be classified into various types, such as a resistive type, a capacitive type, an electromagnetic (EM) type, and an optical type. According to the exemplary embodiment, the capacitive type touch sensor will be described by way of example.

The touch sensor according to the exemplary embodiment includes touch electrodes. The touch electrodes may include first touch electrodes 410 and second touch electrodes 420. The first touch electrode 410 and the second touch electrode 420 may be separated from each other.

The first touch electrodes 410 and the second touch electrodes 420 may be alternately dispersed and disposed so as not to overlap each other in the touch sensing area TA. The first touch electrodes 410 may be disposed along a column direction and a row direction, respectively. The second touch electrodes 420 may be disposed along a column direction and a row direction.

The first touch electrode 410 and the second touch electrode 420 may be positioned in the same layer. However, exemplary embodiments are not limited to the first and second touch electrodes 410 and 420 positioned in the same layer.

The first touch electrode 410 and the second touch electrode 420 may each be a quadrangle. However, exemplary embodiments are not limited to the first touch electrode 410 and the second touch electrode 420 as quadrangle and instead the first and second touch electrodes 410 and 420 may have various shapes including a protrusion to improve sensitivity of the touch sensor.

The first touch electrodes 410 arranged in the same row or column may be connected to or separated from each other inside or outside the touch sensing area TA. Likewise, at least some of the second touch electrodes 420 arranged in the same column or row may also be connected to or separated from each other inside or outside the touch sensing area TA. For example, as illustrated in FIG. 1, when the first touch electrodes 410 disposed in the same row are connected to each other inside the touch sensing area TA, the second touch electrodes 420 disposed in the same column may be connected to each other inside the touch sensing area TA.

The first touch electrodes 410 positioned in each row may be connected to each other through a first connection part 412 and the second touch electrodes 420 positioned in each column may be connected to each other through the second connection part 422.

The first touch electrodes 410 connected to each other in each row may be connected to a touch driver (not illustrated) through the first touch wires 411 and the second touch electrodes 420 connected to each other in each column may be connected to the touch driver through the second touch wires 421. As illustrated in FIG. 1, the first touch wires 411 and the second touch wires 421 may be positioned in the peripheral area PA but are not limited to the peripheral area. Instead, the first and second touch wires 411 and 421 may be positioned in the touch sensing area TA or may be positioned in both the peripheral area PA and the touch sensing area TA.

Ends of the first touch wires 411 and the second touch wires 421 may form a pad part 450 in the peripheral area PA. The pad part 450 may be connected to a touch driver. The touch driver may be directly mounted on the pad part 450 in at least one integrated circuit (IC) chip form or connected to the pad part 450 in a tape carrier package (TCP) form while being mounted on a flexible printed circuit film, or mounted on a separate printed circuit board (PCB) and then connected to the pad part 450. The touch driver may be connected to the first touch wire 411 and the second touch wire 421 through the pad part 450 to transmit and receive a signal.

The first touch electrode 410 and the second touch electrode 420 adjacent to each other may form a mutual sensing capacitor that serves as the touch sensor. The mutual sensing capacitor may receive the sensing input signal through one of the first and second touch electrodes 410 and 420 and may output a change in a quantity of electrical charge due to a contact of an external object as a sensing output signal through the other touch electrodes (i.e., if the mutual sensing capacitor receives the sensing input signal through the first touch electrode 410 than the mutual sensing capacitor may output the sensing output signal through the second touch electrode 420 and vice versa).

In an alternate embodiment, the first touch electrodes 410 and the second touch electrodes 420 are separated from each other. Thus each of the first touch electrodes 410 and the second touch electrodes 420 may be connected to the touch driver (not illustrated) through separate touch wires. In this case, the respective first and second touch electrodes 410 and 420 may form a self-sensing capacitor as the touch sensor. The self-sensing capacitor may receive the sensing input signal to be charged with a predetermined quantity of electrical charge. The self-sensing capacitor may change the quantity of charged electric charge when the contact of the external objects (i.e., a user's finger or a stylus pen) is present, thereby outputting the sensing output signal different from the received sensing input signal.

Figure 2:
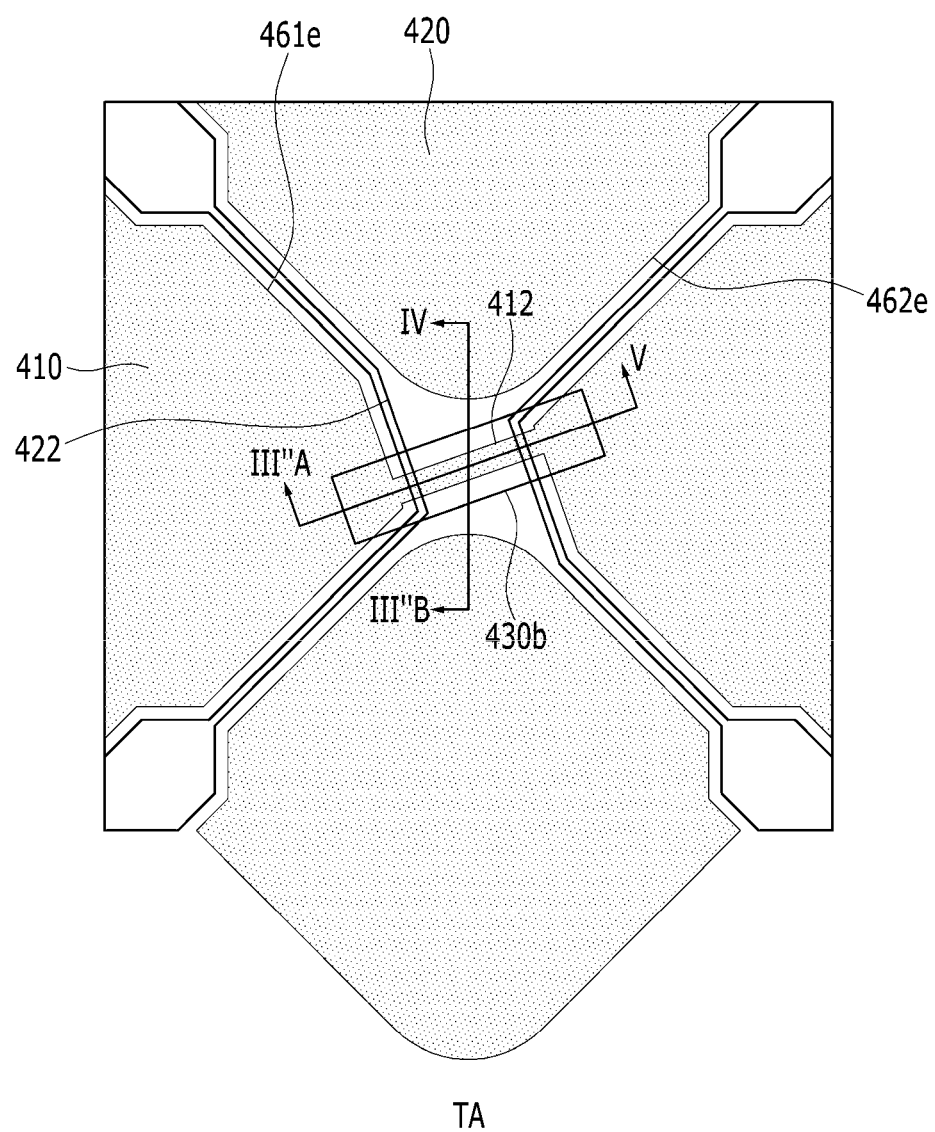
FIG. 2 is an enlarged view of a portion of the touch sensor device illustrated in FIG. 1.
Figure 3:
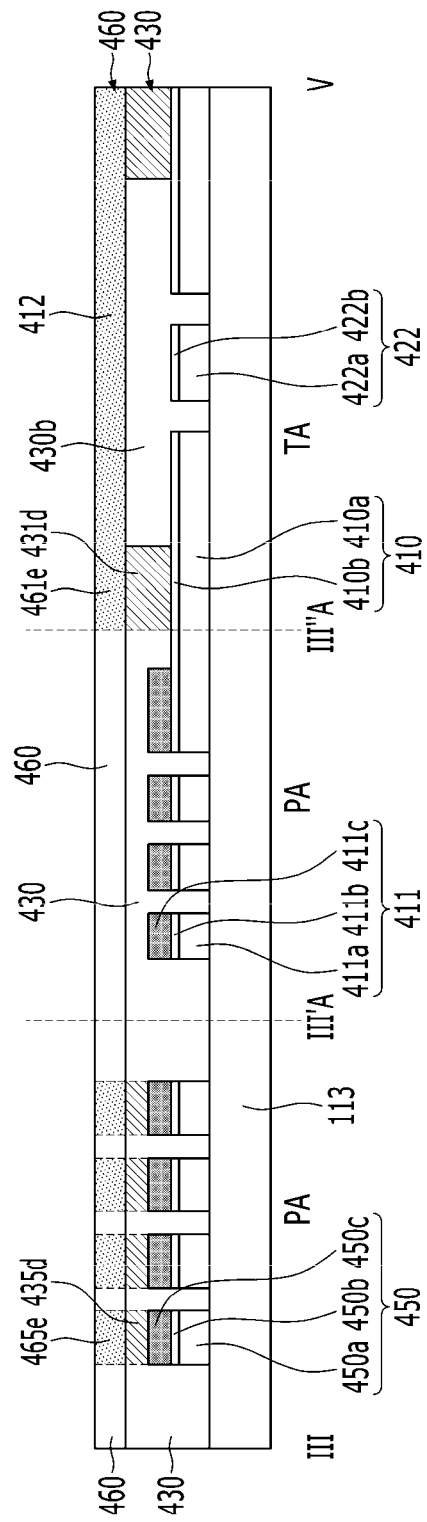
FIG. 3 is a cross-sectional view of the touch sensor device illustrated in FIGS. 1 and 2 taken along the section line III-III'A-III"A-V.
Figure 4:
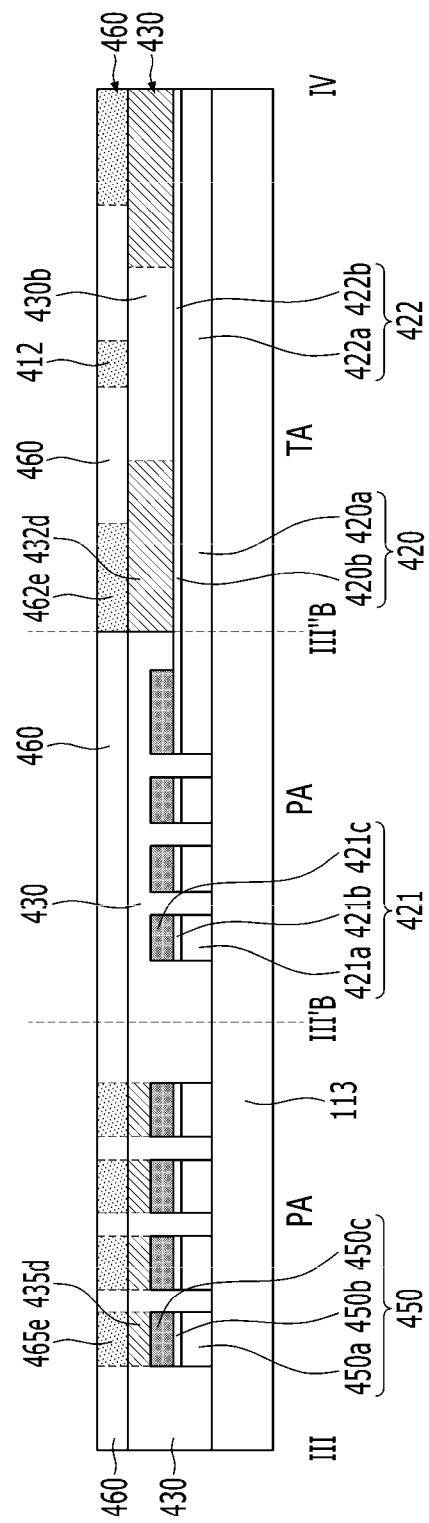
FIG. 4 is a cross-sectional view of the touch sensor device illustrated in FIGS. 1 and 2 taken along the section line III-III'B-III"B-IV.

Referring to FIGS. 2, 3 and 4, the first and second touch electrodes 410 and 420, the second connection part 422, and the first and second touch wires 411 and 421 may be positioned on the substrate 113 as a first conductive pattern. The substrate 113 may include glass or plastic and may have flexibility.

The first touch electrode 410 and the second touch electrode 420 may have predetermined transmittance to transmit light and may include at least one conductive layer. The first and second touch electrodes 410 and 420 may include first conductive layers 410a and 420a and second conductive layers 410b and 420b positioned on the respective first and second touch electrodes 410 and 420.

The first conductive layers 410a and 420a are a main conductive layer and may include a transparent conductive material such as metal nano wire (i.e., silver nano wire (AgNW)), metal mesh, carbon nanotube (CNT), graphene, indium tin oxide (ITO), indium zinc oxide (IZO), gallium indium zinc oxide (GIZO), and zinc aluminum oxide (ZAO). The second conductive layers 410b and 420b are a buffer conductive layer and may include at least one of amorphous ITO and IZO. The second conductive layers 410b and 420b may also be omitted.

The second connection part 422 may connect two adjacent second touch electrodes 420 to each other and may be positioned in the same layer as the second touch electrode 420. The second touch electrode 420 and the second connection part 422 may be unified with each other. The second connection part 422 may be formed by being patterned along with the second touch electrode 420. Therefore, the second connection part 422 may include a first conductive layer 422a including the same material as the first conductive layers 410a and 420a and a second conductive layer 422b positioned on the first conductive layer 422a and including the same material as the second conductive layers 410b and 420b. The second conductive layer 422b may also be omitted.

The first and second touch wires 411 and 421 may include the first conductive layers 411a, 421a, the second conductive layer 411b, 421b positioned on the respective first and second touch wires 411 and 421. Third conductive layers 411c, 421c may be positioned on the respective second conductive layers 411b, 421b. The pad part 450 may include a first conductive layer 450a, a second conductive layer 450b positioned on the first conductive layer 450a, and a third conductive layer 450c positioned on the second conductive layer 450b.

The first conductive layers 411a, 421a, and 450a of the first and second touch wires 411 and 421 and pad part 450 may be positioned in the same layer as the first conductive layers 410a and 420a of the first touch electrode 410 and the second touch electrode 420. In addition, the first conductive layers 411a, 421a, 450a of the first and second touch wires 411 and 421 and the pad part 450 may include the same material as the first conductive layers 410a and 420a of the first and second touch electrodes 410 and 420. The second conductive layers 411b and 421b may be positioned in the same respective layers as the second conductive layers 410b and 420b included in the first touch electrode 410 and the second touch electrode 420. The second conductive layers 411b and 421b may include the same material as the second conductive layers 410b and 420b. When the second conductive layers 410b and 420b are omitted, the second conductive layers 411b and 421b of the first and second touch wires 411 and 421 may also be omitted.

The third conductive layers 411c, 421c, and 450c of the first and second touch wires 411 and 421 and the pad part 450 may have resistance lower than the first conductive layers 411a and 421a and second conductive layers 411b and 421b. The third conductive layers 411c and 450c may include low resistance materials such as metals (i.e., molybdenum (Mo), silver (Ag), titanium (Ti), copper (Cu), palladium (Pd), aluminum (Al), molybdenum/aluminum/molybdenum (Mo/Al/Mo)), or metal alloys (i.e., silver palladium copper (APC)).

Referring to FIGS. 1 to 4, a lower polymer layer 430 may be positioned over an entire surface of the first and second touch electrodes 410 and 420, the first conductive pattern including the first and second touch wires 411 and 421, and the exposed substrate 113. The lower polymer layer 430 is continuously formed on the substrate 113 and is divided into a conductive region having conductivity and a non-conductive region having non-conductivity. The conductive region and the non-conductive region both are positioned on the lower polymer layer 430. A thickness of the conductive region of the lower polymer layer 430 may be substantially equal to the non-conducive region of the lower polymer layer 430. However, an exemplary embodiment includes a lower polymer layer 430 with a thickness of the conductive region thicker than the non-conductive region. Alternatively, an exemplary embodiment includes a lower polymer layer 430 with a thickness of the conductive region thinner than the non-conductive region.

The conductive region of the lower polymer layer 430 may include a first conductive region 431d that is electrically connected to the first touch electrode 410. The first conductive region 431d may be connected to the first connection part 412 and an upper surface of the first touch electrode 410 (i.e., through second conductive layer 410b). The conductive region of the lower polymer layer 430 may include a second conductive region 432d that is electrically connected to the second touch electrode 420. The second conductive region 432d may contact an upper surface of the second touch electrode 420 (i.e., second conductive layer 420b). The conductive region of the lower polymer layer 430 may include a third conductive region 435d that is electrically connected to the third conductive layer 450c of the pad part 450. The third conductive region 435d may contact an upper surface of the third conductive layer 450c.

The first conductive region 431d may be positioned only on each first touch electrode 410, the second conductive region 432d may be positioned only on each second touch electrode 420, and the third conductive region 435d may be positioned only on the third conductive layer 450c of each pad part 450. A size of the first conductive region 431d may be appropriately controlled from a minimum size to a size corresponding to largest area of each first touch electrode 410, in consideration of the contact resistance.

The second conductive region 432d may also be omitted. In this case, the area corresponding to the second conductive region 432d may be the non-conductive region.

FIGS. 3 and 4 illustrate that an edge of the third conductive region 435d of the lower polymer layer 430 may be aligned with an edge of the pad part 450. However, an exemplary embodiment includes the third conductive region 435d having an edge extending beyond the edge of the pad part 450. An exemplary embodiment also includes the third conductive region 435d having an edge ending prior to the edge of the pad part 450 (i.e., the edge of the pad part 450 extends beyond the edge of the third conductive region 435d). When the edge of the pad part 450 extends beyond the edge of the third conductive region 435d, the non-conductive region of the lower polymer layer 430 may cover a portion of the upper surface of the pad part 450.

The remaining portion other than the first conductive region 431d, the second conductive region 432d, and the third conductive region 435d of the lower polymer layer 430 may be a non-conductive region (i.e., an insulating area). The non-conductive region may include a portion covering the first and second touch wires 411 and 421 and a first insulating area 430b that is positioned between the first connection part 412 and the second connection part 422 in the touch sensing area TA to insulate the first connection part 412 from the second connection part 422. The first insulating area 430b may be limited to an intersecting area of the first connection part 412 with the second connection part 422. The first insulating area 430b may cover a portion of the first touch electrode 410 that will be connected by the first connection part 412.

The non-conductive region of the lower polymer layer 430 may cover the first and second touch wires 411 and 421 other than the pad part 450 in the peripheral area PA to protect the first and second touch wires 411 and 421. The non-conductive region may prevent a short circuit between the first and second touch wires 411 and 421 or a short circuit with other wires.

An upper polymer layer 460 may be positioned over an entire surface of the lower polymer layer 430. The upper polymer layer 460 may be continuously formed on the substrate 113. Similar to the lower polymer layer 430, the upper polymer layer 460 may be divided into a conductive region having conductivity and a non-conductive region having non-conductivity. A thickness of the conductive region of the upper polymer layer 460 may be substantially equal to the non-conducive region of the upper polymer layer 460. However, an exemplary embodiment includes an upper polymer layer 460 with a thickness of the conductive region thicker than the non-conductive region. Alternatively, an exemplary embodiment includes an upper polymer layer 460 with a thickness of the conductive region thinner than the non-conductive region.

The conductive region of the upper polymer layer 460 may include the first connection part 412 connecting two adjacent first touch electrodes 410 to each other and a fourth conductive region 465e that is positioned on a third conductive region 435d of the lower polymer layer 430.

The first connection part 412 may contact the two adjacent first conductive regions 431d of the lower polymer layer 430 and may be electrically connected to the two adjacent first conductive regions 431d of the lower polymer layer 430. Therefore, the first connection part 412 may electrically connect the two adjacent first touch electrodes 410 through the first conductive region 431d. The first connection part 412 may be positioned on the first insulating area 430b of the lower polymer layer 430 and may be insulated from the second connection part 422.

The fourth conductive region 465e may be electrically connected to the third conductive region 435d that is connected to the third conductive layer 450c of the pad part 450. The fourth conductive region 465e may contact an upper surface of the third conductive region 435d. The fourth conductive region 465e may be positioned only on each third conductive region 435d that is positioned on each pad part 450. FIGS. 3 and 4 illustrate that an edge of the fourth conductive region 465e of the upper polymer layer 460 may be aligned with the edge of the pad part 450. However, an exemplary embodiment includes the fourth conductive region 465e having an edge extending beyond the edge of the pad part 450. An exemplary embodiment also includes the fourth conductive region 465e having an edge ending prior to the edge of the pad part 450 (i.e., the edge of the pad part 450 extends beyond the edge of the fourth conductive region 465e). When the edge of the pad part 450 extends beyond the edge of the fourth conductive region 465e, the non-conductive region of the upper polymer layer 460 may cover a portion of the upper surface of the pad part 450.

Referring to FIGS. 2 to 4, the conductive region of the upper polymer layer 460 may further include fourth conductive layers 461e and 462e that are positioned on the first and second touch electrodes 410 and 420. The fourth conductive layer 461e may be positioned only on each first touch electrode 410 and may be electrically connected to the first conductive region 431d of the lower polymer layer 430 and may contact the first conductive region 431d. The fourth conductive layer 462e may be positioned only on each second touch electrode 420 and may be electrically connected to the second conductive region 432d of the lower polymer layer 430 and may contact the second conductive region 432d.

When the fourth conductive layers 461e and 462e are positioned on the first and second touch electrodes 410 and 420, the first connection part 412 may be directly connected to the fourth conductive layer 461e.

The fourth conductive layers 462e that are positioned on the second touch electrode 420 may be arranged along a column direction and may be separated from each other.

It is possible to improve bendability and adherence of the first and second touch electrodes 410 and 420 by the fourth conductive layers 461e and 462e that are positioned on the first and second touch electrodes 410 and 420.

The remaining portion of the upper polymer layer 160, excluding the first connection part 412, the fourth conductive region 465e, and/or the fourth conductive layers 461e and 462e, may be the non-conductive region (i.e., the insulating area).

The lower polymer layer 430 and the upper polymer layer 460 may be continuously stacked.

The lower polymer layer 430 and the upper polymer layer 460 may each include a polymer material such as polyacetylene (PA), polyaniline (PANI), polythiophene (PT), polypyrrole (PPy), polyphenylenevinylene (PPV), and poly (3,4-ethylenedioxythiopene) (PEDOT). Among these listed polymers, PEDOT may be obtained by polymerizing 3,4-ethylenedioxythiopene (EDOT). PEDOT may have good bendability, heat resistance, and conductivity characteristics. The PEDOT is insoluble. Thus, a conductive material of a PEDOT base may be dissolved in an organic solvent using polystyrene sulfonate (PSS) that is water-soluble polymer. Alternatively, a conductive material of PEDOT of the base may be dispersed in an aqueous solvent to obtain a waterborne polythiopene derivative (PEDOT:PSS). The PEDOT:PSS has high transparency, conductivity, excellent heat resistance, and safety. The PEDOT:PSS may further include additives such as dimethyl sulfoxide (DMSO) and ethylene glycol (EG). In this case, the conductivity may be changed depending on the amount and type of additives included with PEDOT:PSS.

The non-conductive region may be formed by stacking the polymer material (i.e., PEDOT), covering a portion remaining as the conductive region with a mask, and then deactivating the exposed portion, thereby dividing the conductive region and the non-conductive region of the lower polymer layer 430 and the upper polymer layer 460, respectively. The deactivation of the lower polymer layer 430 and the upper polymer layer 460 may use an oxidation method that includes oxidizing agents (i.e., ceric ammonium nitrate (CAN) and sodium hypochlorite (NaOCl)). The lower polymer layer 430 and the upper polymer layer 460 that are not oxidized maintain conductivity.

According to the exemplary embodiment, the lower polymer layer 430 and the upper polymer layer 460 are positioned on the first and second touch electrodes 410 and 420 and the first and second touch wires 411 and 421, such that the touch sensor device 400 may have the improved flexibility and bendability. Therefore, the flexible touch sensor device 400 may be foldable (bendable), rollable, or stretchable in at least one direction or may have advanced flexibility such as elasticity may be manufactured.

The lower polymer layer 430 that is positioned on the first conductive pattern such as the first and second touch electrodes 410 and 420 and the first and second touch wires 411 and 421 may include the continuously formed conductive region and non-conductive region. Thus, the lower polymer layer 430 may not have a step, such that a conductive pattern positioned on the lower polymer layer 430 is not likely to be short-circuited. Similarly, the upper polymer layer 460 also includes the continuously formed conductive region and non-conductive region and therefore does not have a step, such that the conductive pattern like the first connection part 412 of the upper polymer layer 460 is less likely to be short-circuited.

The fourth conductive layers 461e and 462e that are positioned on the first and second touch electrodes 410 and 420 may increase electrical paths of the first and second touch electrodes 410 and 420 to reduce resistance. When defects (i.e., cracks) occur in the first conductive layers 410a and 420a and/or the second conductive layers 410b and 420b of the first and second touch electrodes 410 and 420, the fourth conductive layers 461e and 462e provide the electrical paths that may supplement the defects to prevent the occurrence of touch sensing defects.

In particular, the transparent first conductive layers 410a and 420a and the second conductive layers 410b and 420b may be positioned beneath the first and second conductive regions 431d and 432d of the lower polymer layer 430 and the fourth conductive layers 461e and 462e of the upper polymer layer 460 to reduce the blue tint from the polymer materials (i.e., PEDOT), thereby improving the light characteristics and reducing the sheet resistance.

An exemplary embodiment includes the first connection part 412 connected to the fourth conductive layer 461e and having a contact resistance smaller than an exemplary embodiment that includes the first connection part 412 directly contacting the first conductive region 431d of the lower polymer layer 430 (i.e., without a fourth conductive layer 461e). A difference in resistance between the first touch electrode 410 and the first connection part 412 of the exemplary embodiment including the fourth conductive layer 461e is reduced such that it is possible to prevent static electricity from occurring. Thus, damage to the first touch electrode 410 and the first connection part 412 from static electricity may be prevented.

The lower polymer layer 430 and the upper polymer layer 460 may not patterned but may be applied to the entire surface of the substrate 113 such that a top layer and an intermediate layer of the touch sensor device 400 may be protected from corrosion or oxidation. In particular, the non-conductive region may serve as an insulating layer or an overcoat. Therefore, there is no need to form an additional insulating layer on the conductive pattern (i.e., the first and second touch electrodes 410 and 420, the first and second touch wires 411 and 421, and the pad part 450), thereby simplifying the manufacturing process of the touch sensor device 400.

Unlike the exemplary embodiments described so far, the first connection part 412 connecting two adjacent first touch electrodes 410 to each other may be positioned in the same layer as the first touch electrode 410 and may be integrated with the first touch electrode 410 and the second connection part 422 connecting two adjacent second touch electrodes 420 to each other, may be positioned on a different layer from the second touch electrode 420 and may also be formed of the conductive region of the upper polymer layer 460. In this case, features of the second connection part 422 and the structure connected to the second connection part 422 may be identically applied to the features of the first connection part 412 described above.

Next, the touch sensor device according to the exemplary embodiment will be described with reference to FIGS. 5, 6, and 7, along with the above-mentioned drawings.

Figure 5:
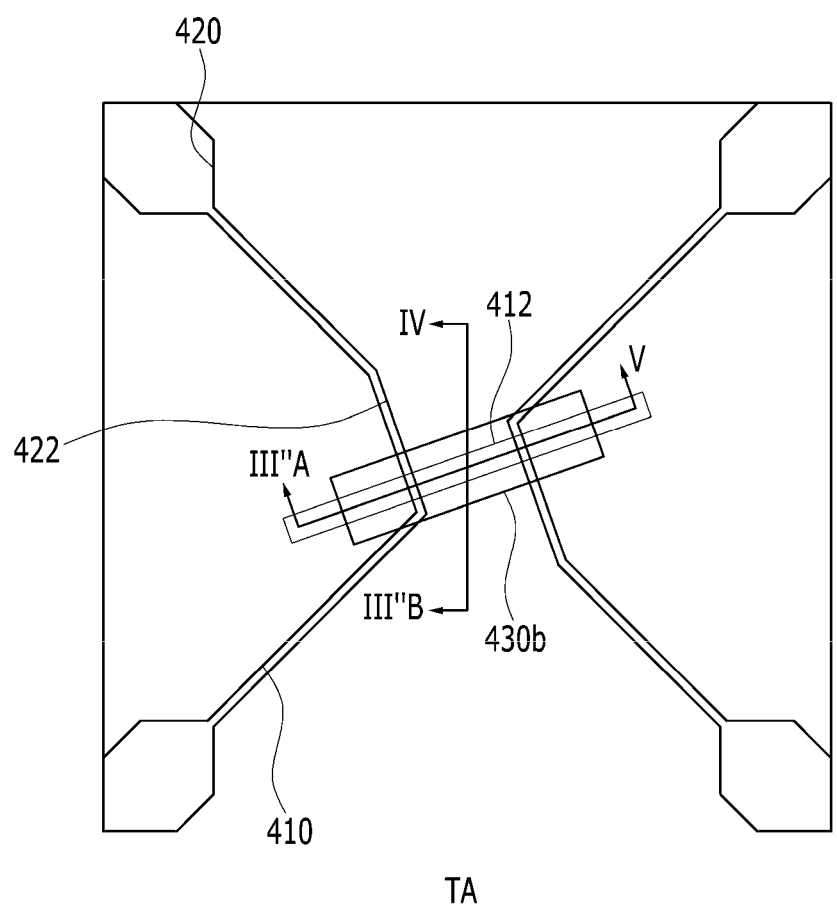
FIG. 5 is an enlarged view of a portion of the touch sensor device illustrated in FIG. 1.
Figure 6:
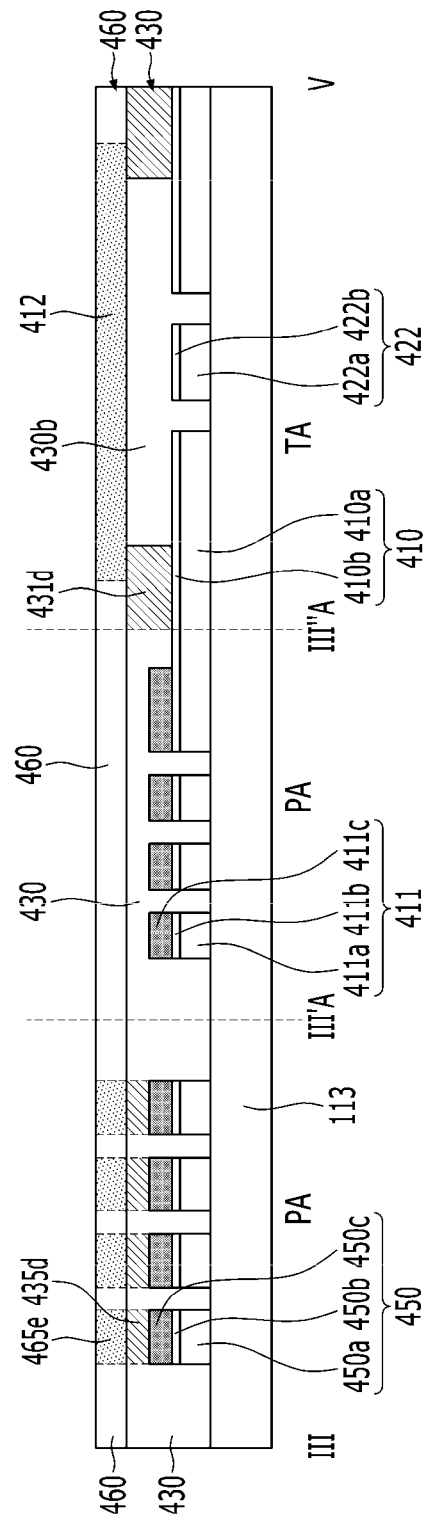
FIG. 6 is a cross-sectional view of the touch sensor device illustrated in FIGS. 5 and 1 taken along the section line III-III'A-III"A-V.
Figure 7:
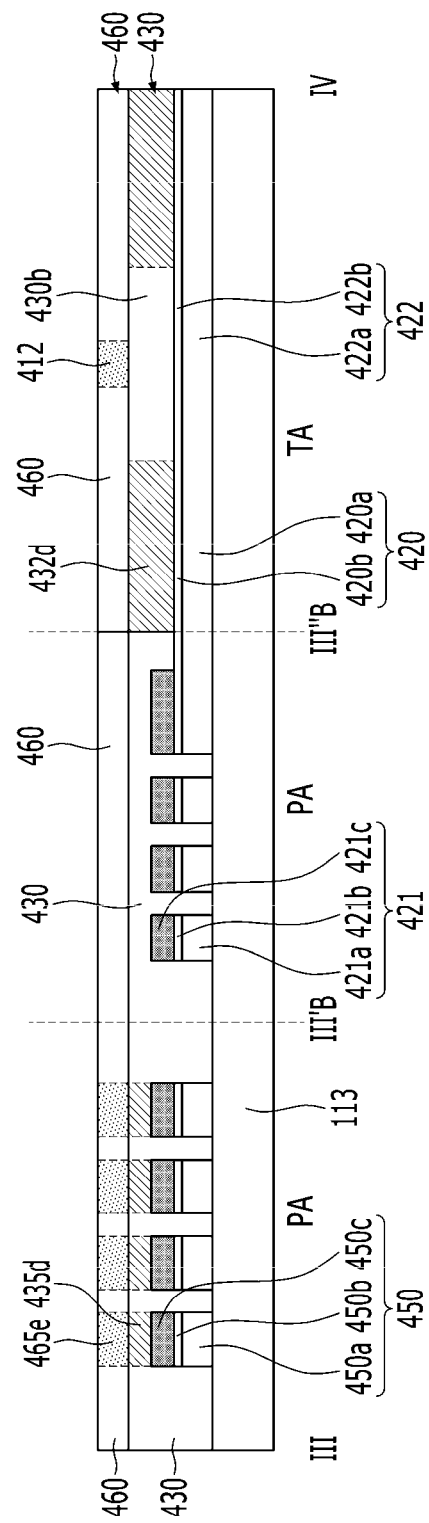
FIG. 7 is a cross-sectional view of the touch sensor device illustrated in FIGS. 5 and 1 taken along the section line III-III'B-III"B-IV.

Referring to FIGS. 5, 6, and 7, a touch sensor device according to an exemplary embodiment is substantially the same as the touch sensor device according to the exemplary embodiments discussed above. However, FIGS. 5, 6, and 7 illustrate an exemplary embodiment that omit the fourth conductive layers 461e and 462e are respectively positioned on the first and second touch electrodes 410 and 420 the conductive region of the upper polymer layer 460 as previously shown in FIGS. 3 and 4. More specifically, an exemplary embodiment includes the conductive region of the upper polymer layer 460 in the touch sensing area TA limited to the first connection part 412 connecting two adjacent first touch electrodes 410 to each other.

Next, a manufacturing method of a touch sensor device according to an exemplary embodiment will be described with reference to FIGS. 8, 9, 10, 11, 12, 13, 14, 15, and 16, along with the above-mentioned drawings.

Figure 8:
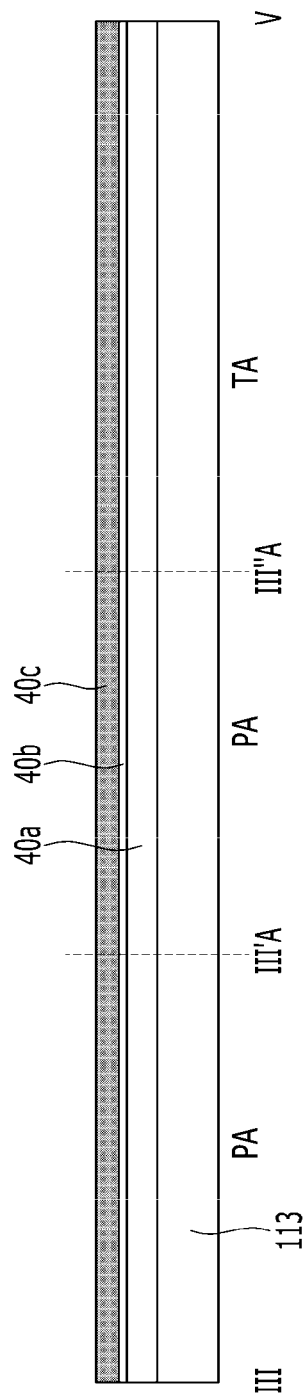
FIGS. 8, 9, 10, 11, 12, 13, 14, 15, and 16 are cross-sectional views sequentially illustrating an intermediate product manufactured by a manufacturing method of a touch sensor according to an exemplary embodiment sequentially illustrated according to a process order by taken along the section line corresponding to the III-III'A-III"A-V illustrated in FIGS. 1 and 2.

Referring first to FIG. 8, the substrate 113 including glass or plastic may be prepared and a first conductive layer 40a may be formed by stacking metal nano wires (i.e., silver nano wire (AgNW)) and the transparent conductive materials (i.e., metal mesh, carbon nanotube (CNT), graphene, indium tin oxide (ITO), indium zinc oxide (IZO), gallium indium zinc oxide (GIZO), and zinc aluminum oxide (ZAO)).

Next, the conductive materials (i.e., ITO and IZO) may be stacked on a first conductive layer 40a to form a second conductive layer 40b. However, in an exemplary embodiment, the process of forming the second conductive layer 40b is omitted. Next, low resistance materials such as metals (i.e., molybdenum (Mo), silver (Ag), titanium (Ti), copper (Cu), palladium, aluminum (Al), molybdenum/aluminum/molybdenum (Mo/Al/Mo)) or metal alloys (i.e., silver palladium copper (APC)) may be stacked on the second conductive layer 40b to form a third conductive layer 40c.

Figure 9:
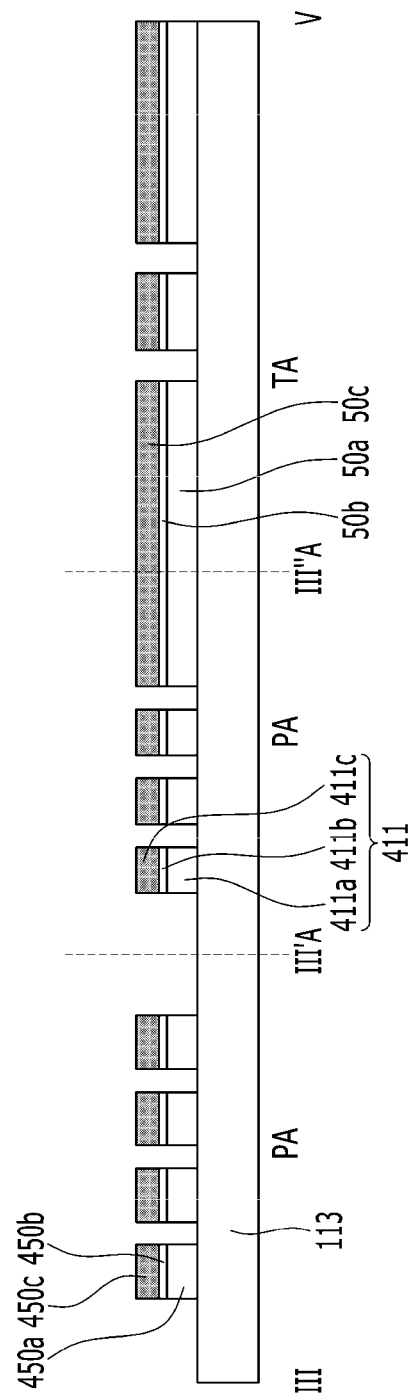

Next, referring to FIG. 9, the first conductive layer 40a, the second conductive layer 40b, and the third conductive layer 40c may be patterned by photolithography to form the first conductive layer 450a, the second conductive layer 450b, and the third conductive layer 450c of the pad part 450, the first conductive layer 411a, the second conductive layer 411b, and the third conductive layer 411c of the first touch wires 411, and the first conductive layer 421a, the second conductive layer 421b, and the third conductive layer 421c of the second touch wires 421 (not shown) to form the conductive pattern positioned in the touch sensing area TA while including a first conductive layer 50a, a second conductive layer 50b, and a third conductive layer 50c. A form of the conductive pattern may be substantially equal to the first and second touch electrodes 410 and 420 described above.

Figure 10:
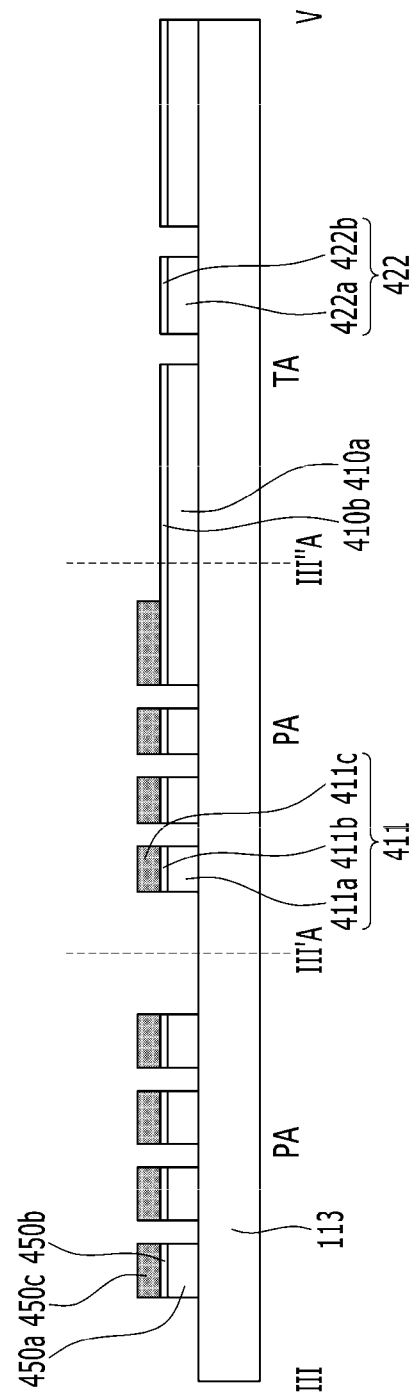

Next, referring to FIG. 10, the third conductive layer 50c, which is the top layer of the conductive pattern positioned in the touch sensing area TA, may be removed (i.e. through photolithography) to form the transparent first touch electrodes 410, the transparent second touch electrodes 420, and the transparent second connection parts 422. In an exemplary embodiment where the first touch electrodes 410 arranged in the same column are connected to each other by the first connection part 412 positioned in the same layer, instead of the second connection part 422, the first connection part 412 is also formed.

Figure 11:
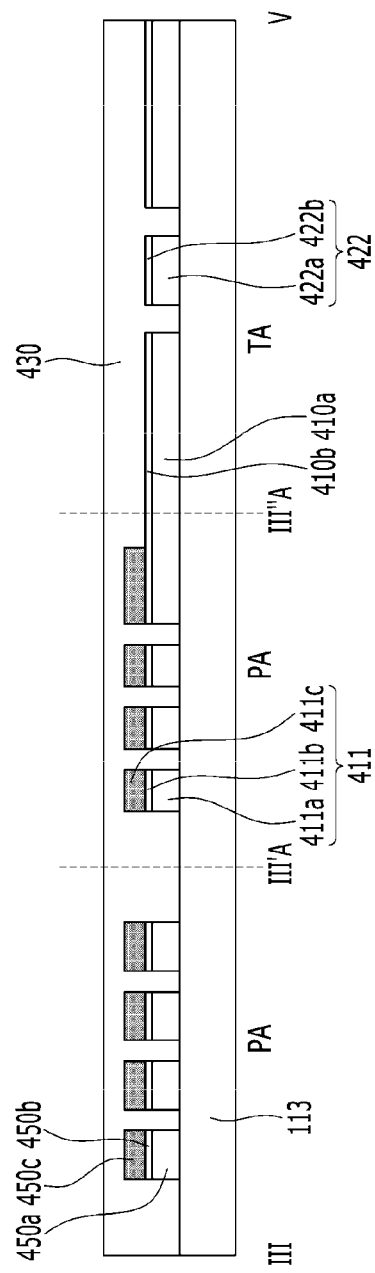

Next, referring to FIG. 11, the conductive polymer materials (i.e., polyacetylene (PA), polyaniline (PANI), polythiophene (PT), polypyrrole (PPy), polyphenylenevinylene (PPV), and poly (3,4-ethylenedioxythiopene) (PEDOT)) may be applied on the first touch electrode 410, the second touch electrode 420, the second connection part 422, and the first and second touch wires 411 and 421 to form the lower polymer layer 430.

Figure 12:
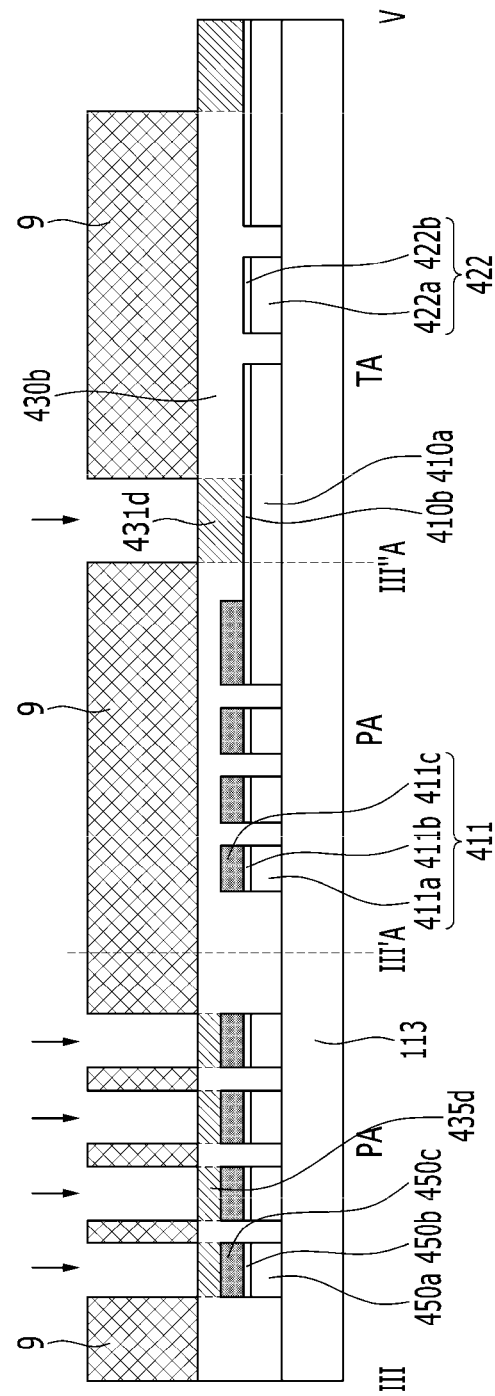

Next, referring to FIG. 12, the photoresist may be applied on the lower polymer layer 430 and may be exposed and developed to form a mask pattern 9 for creating the non-conductive region in the lower polymer layer 430.

Next, the lower polymer layer 430 which is not covered with the mask pattern 9 is oxidized by the oxidizing agents (i.e., ceric ammonium nitrate (CAN) and sodium hypochlorite (NaOCl)) to remove the conductivity. Thus, the lower polymer layer 430 including the conductive region and the non-conductive region described above is complete.

Therefore, a first conductive region 431*d* contacting the upper surface of the first touch electrode 410, a third conductive region 435*d* contacting the upper surface of the third conductive layer 450*c* of the pad part 450 are complete. The lower polymer layer 430 may include the second connection part 422 passing between the first touch electrodes 410 that are adjacent to each other and the first insulating area 430*b* covering some area of the first touch electrodes 410 adjacent to the second connection part 422.

Figure 13:
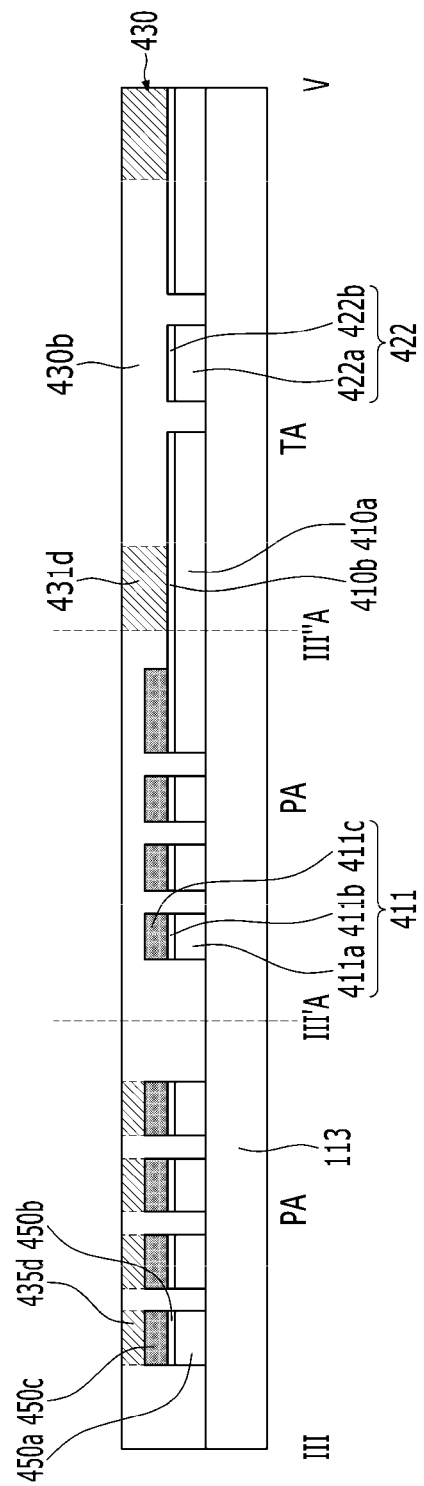

Next, referring to FIG. 13, the mask pattern 9 is removed.

Figure 14:
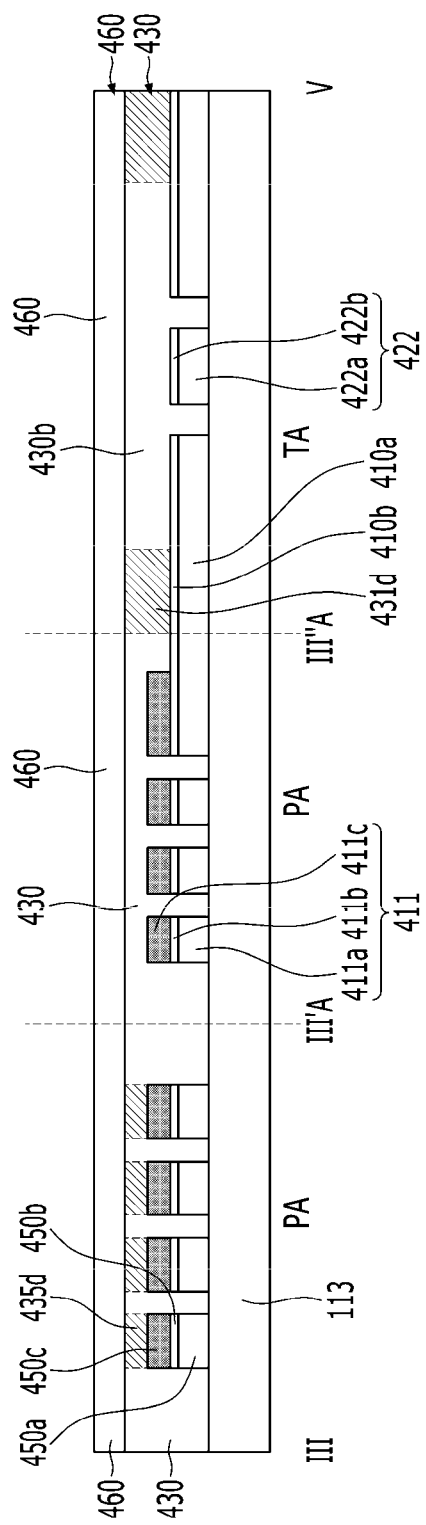

Next, referring to FIG. 14, the conductive polymer materials (i.e., polyacetylene (PA), polyaniline (PANI), polythiophene (PT), polypyrrole (PPy), polyphenylenevinylene (PPV), and poly (3,4-ethylenedioxythiopene) (PEDOT)) may be applied on the entire surface of the substrate 113 to form the upper polymer layer 460.

Figure 15:
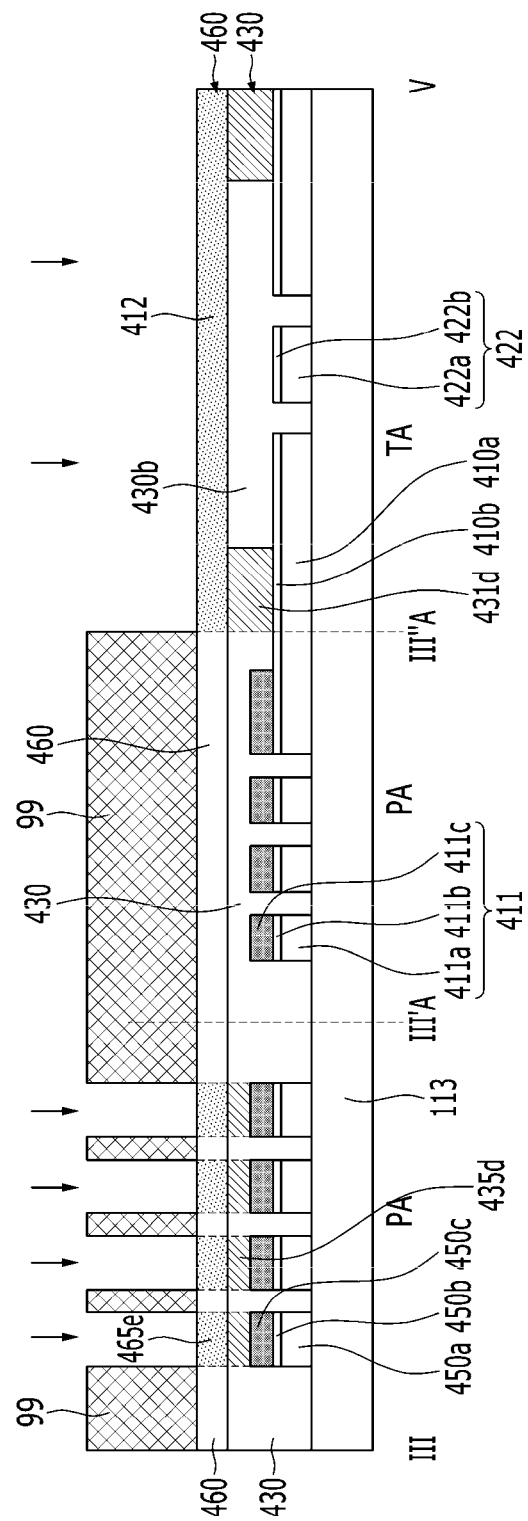

Next, referring to FIG. 15, the photoresist may be applied on the upper polymer layer 460 and may be exposed and developed to form a mask pattern 99 for creating the non-conductive region in the upper polymer layer 460.

Next, the upper polymer layer 460 that is not covered with the mask pattern 99 may be oxidized by the oxidizing agents (i.e., ceric ammonium nitrate (CAN) and sodium hypochlorite (NaOCl)) to remove the conductivity. Thus, the upper polymer layer 460 including the conductive region and the non-conductive region described above is complete.

Figure 16:
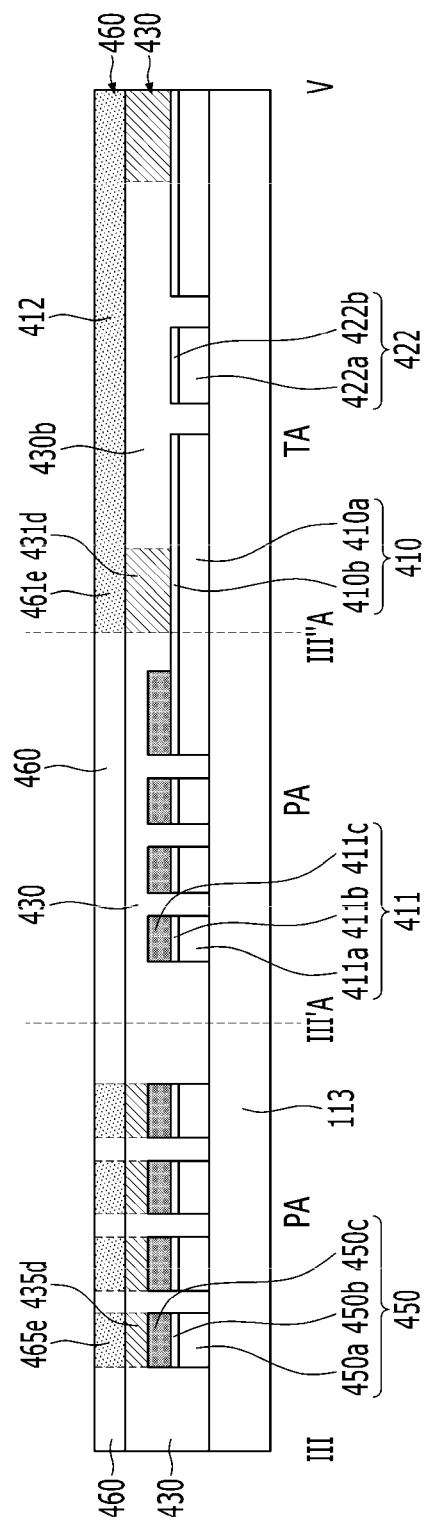

Next, referring to FIG. 16, the mask pattern 99 may be removed. Thus, the first connection part 412 connecting two adjacent first touch electrodes 410 to each other, the fourth conductive layers 461*e* and 462*e* that are positioned on the first and second touch electrodes 410 and 420, the fourth conductive region 465*e* that is positioned on the third conductive region 435*d* of the lower polymer layer 430 are complete.

Next, the touch sensing device including the touch sensor according to an exemplary embodiment will be described with reference to FIG. 17, along with the above-mentioned drawings.

Figure 17:
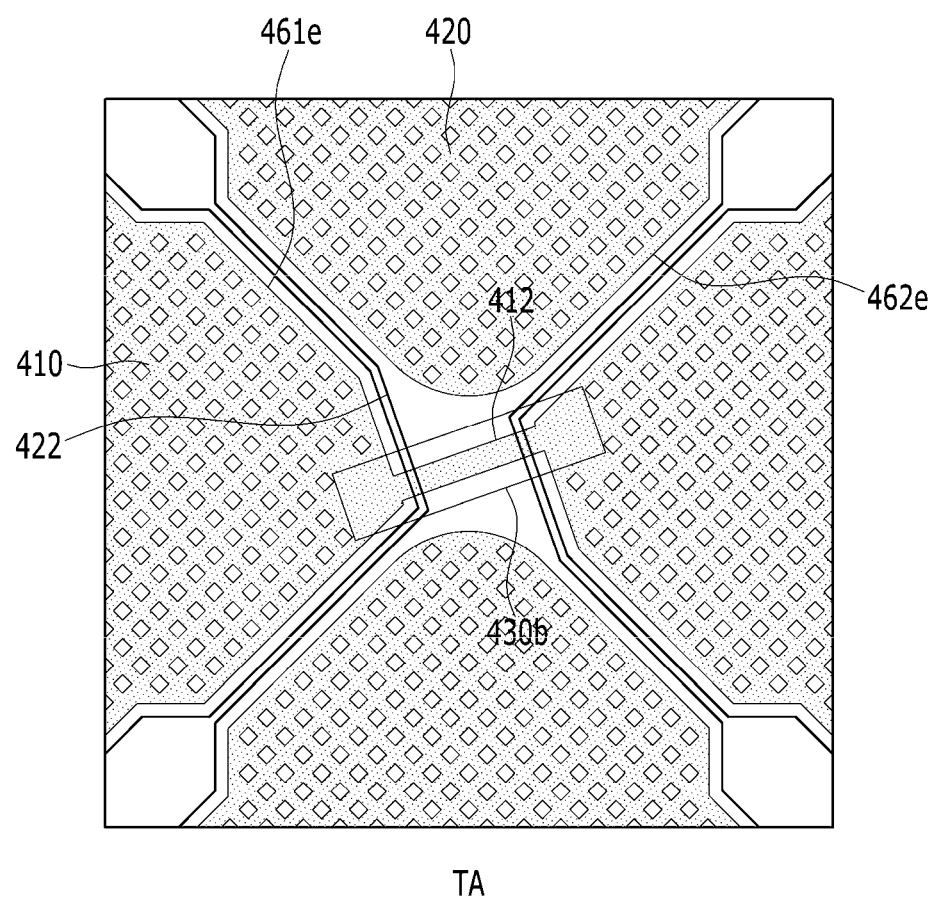
FIG. 17 is an enlarged view of a portion of the touch sensor device illustrated in FIG. 1.

The touch sensor device according to an exemplary embodiment shown in FIG. 17 is substantially the same as the touch sensor device according to the exemplary embodiment described shown in FIG. 1, except the form of the fourth conductive layers 461*e* and 462*e* positioned on the first and second touch electrodes 410 and 420. Referring to FIG. 17, the fourth conductive layers 461*e* and 462*e* may be a mesh type including openings while there are no openings in the exemplary embodiment shown in FIG. 2. Therefore, the transmittance of the area corresponding to the first and second touch electrodes 410 and 420 of FIG. 17 may be increased when compared to the exemplary embodiment of FIG. 2. Thus, the transmittance of the touch sensing area TA may correspondingly increase.

Next, the touch sensor device according to the exemplary embodiment will be described with reference to FIGS. 18 and 19, along with the above-mentioned drawings.

Figure 18:
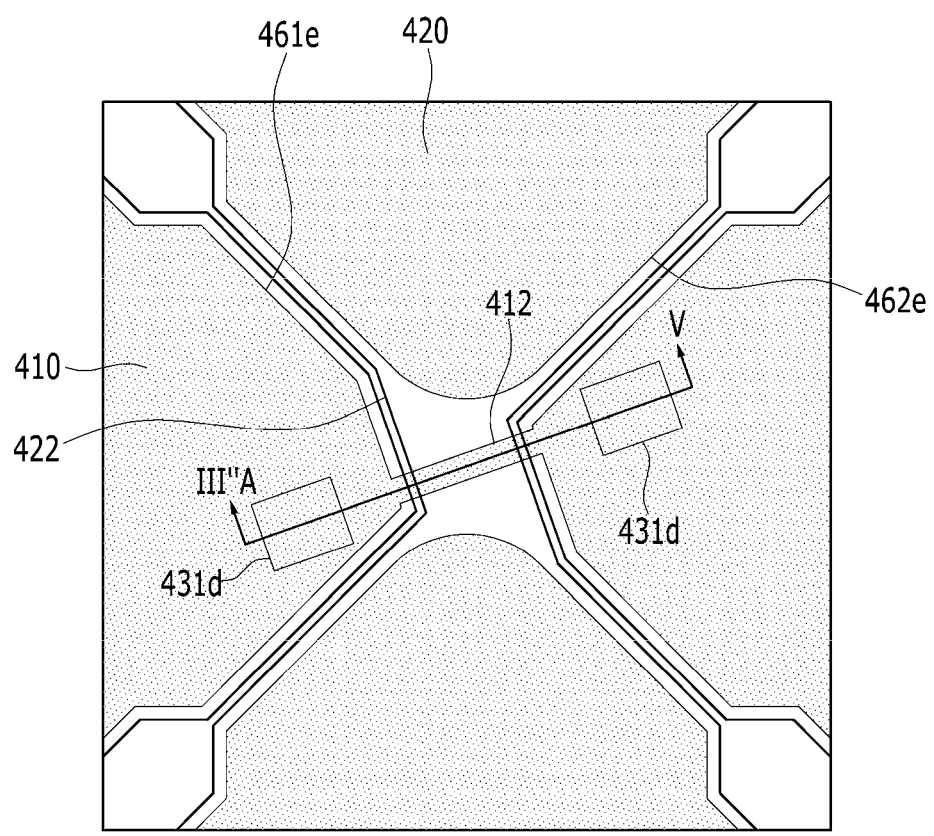
FIG. 18 is an enlarged view of a portion of the touch sensor device illustrated in FIG. 1.
Figure 19:
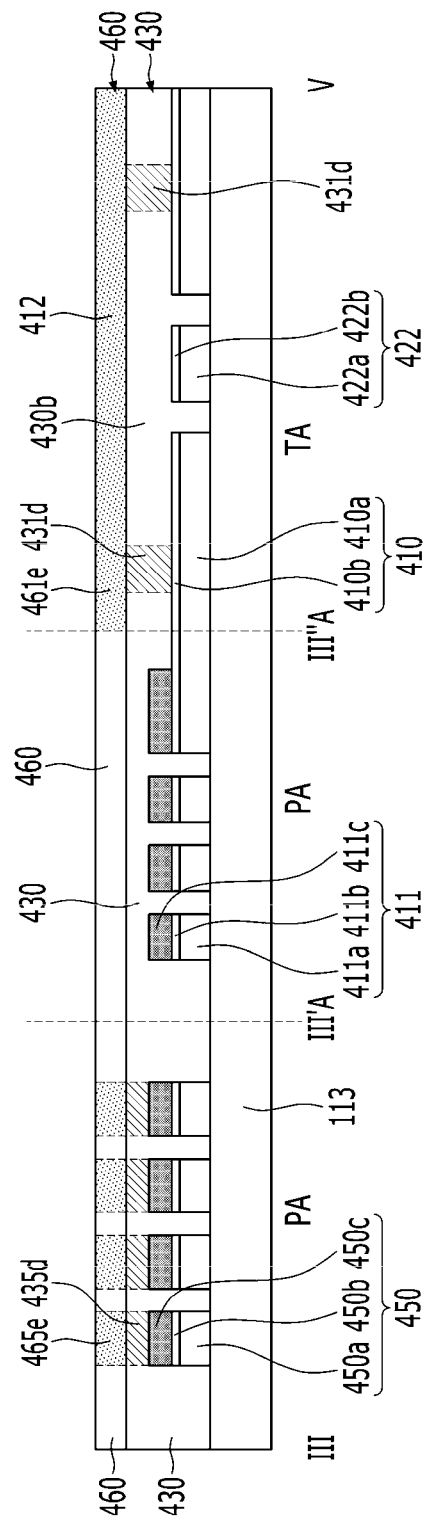
FIG. 19 is a cross-sectional view of the touch sensor device illustrated in FIGS. 18 and 1 taken along the section line III-III'A-III"A-V.

The touch sensor device including the touch sensor according to an exemplary embodiment shown in FIGS. 18 and 19 is substantially the same as the touch sensor device according to the exemplary embodiment shown in FIGS. 2 and 3, except FIGS. 18 and 19 illustrate that the non-conductive region of the lower polymer layer 430 is in most of the touch sensing area TA and the conductive region of the lower polymer layer 430 only covers some of the area of the first touch electrode 410. In other words, the conductive region of the lower polymer layer 430 in the touch sensing area TA may be limited onto some of the area of the first touch electrode 410 which will be connected by the first connection part 412. The conductive region of the lower polymer layer 430 positioned on the first touch electrode 410 may include any shape (i.e., a quadrangle or a circle).

Next, the touch sensor device according to the exemplary embodiment of will be described with reference to FIGS. 20 and 21, along with the above-mentioned drawings.

Figure 20:
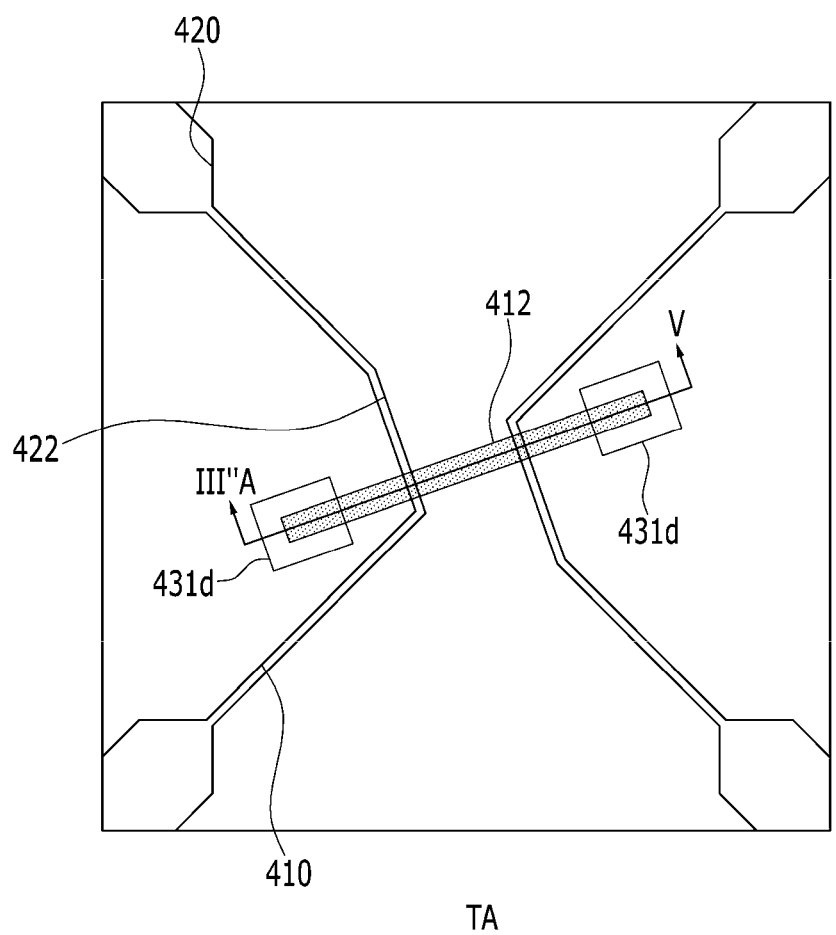
FIG. 20 is an enlarged view of a portion of the touch sensor device illustrated in FIG. 1.
Figure 21:
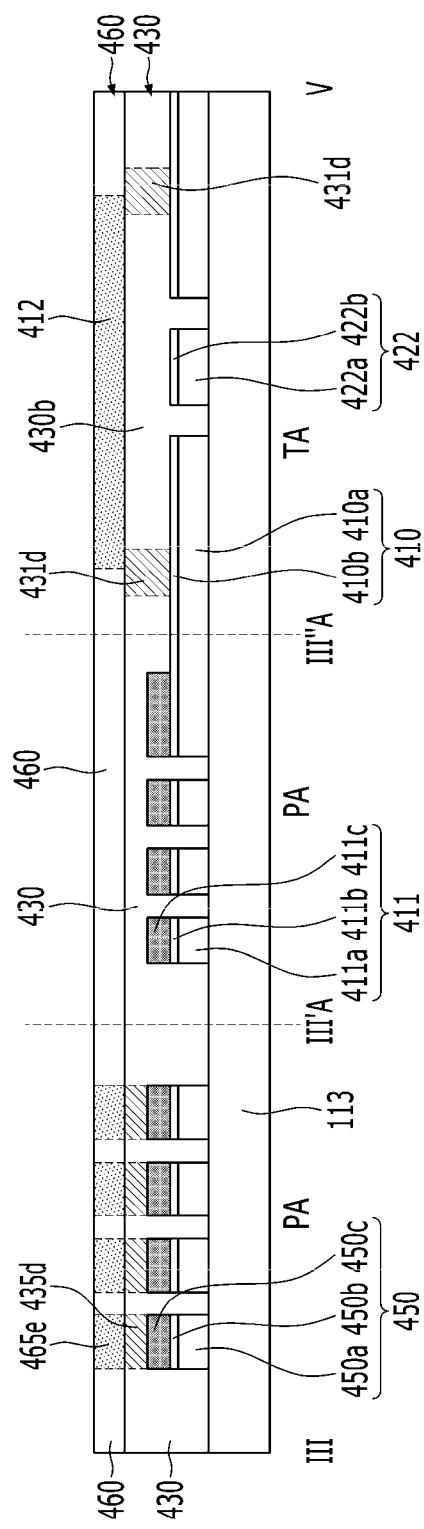
FIG. 21 is a cross-sectional view of the touch sensor device illustrated in FIGS. 20 and 1 taken along the section line III-III'-III"-V.

The touch sensor device including the touch sensor according to an exemplary embodiment shown in FIGS. 20 and 21 is substantially the same as the touch sensor device according to the exemplary embodiment shown in FIGS. 18 and 19, except the fourth conductive layers 461*e* and 462*e* which are each positioned on the first and second touch electrodes 410 and 420 of the conductive region of the upper polymer layer 460 may be omitted. In other words, the conductive region of the upper polymer layer 460 in the touch sensing area TA may be limited to the first connection part 412 connecting two adjacent first touch electrodes 410 to each other. The first connection part 412 may be connected to the conductive regions 431*d* of the lower iii polymer layer 430 positioned on the first touch electrodes 410 two adjacent to each other, that are adjacent to each other to electrically connect between the first two conductive regions 431*d*. Therefore, the first touch electrodes 410 that are adjacent to each other may be electrically connected to each other by the first connection part 412.

Next, the touch sensor device according to an exemplary embodiment will be described with reference to FIGS. 22 and 23, along with the above-mentioned drawings.

Figure 22:
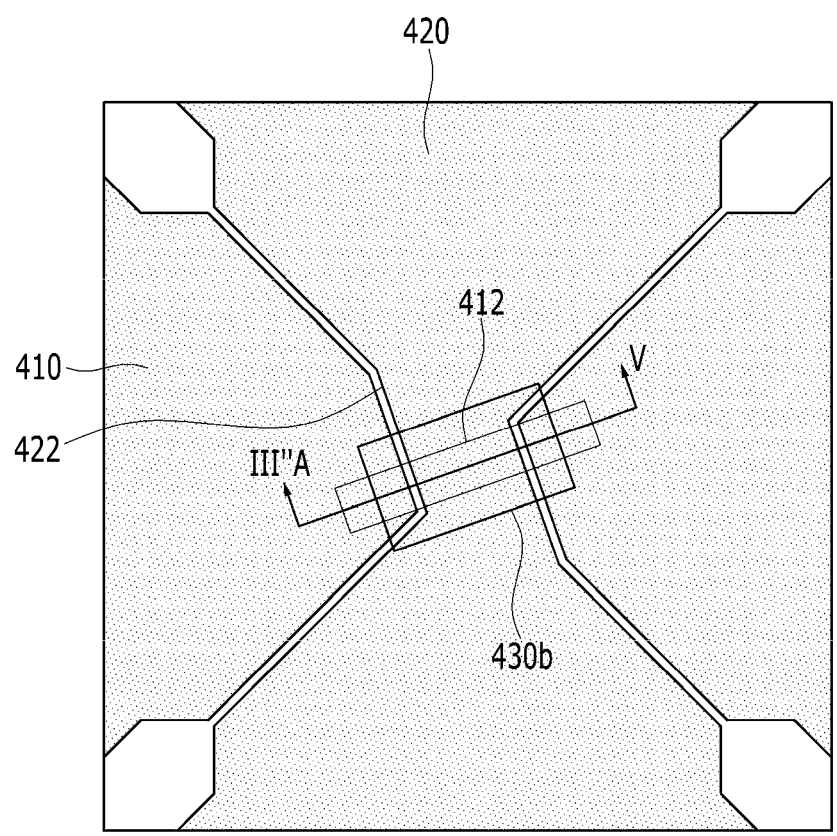
FIG. 22 is an enlarged view of a portion of the touch sensor device illustrated in FIG. 1.
Figure 23:
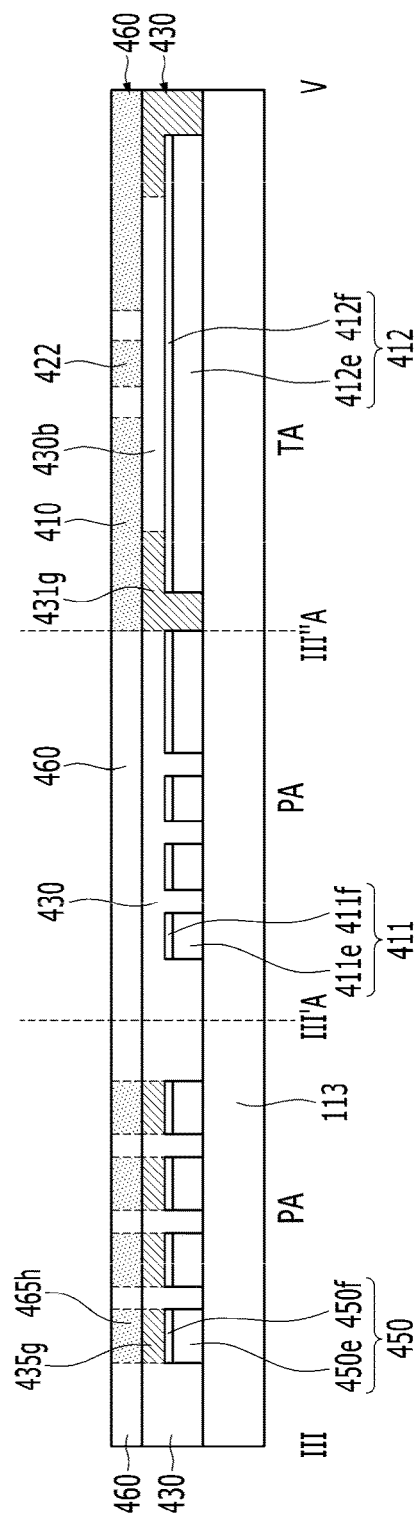
FIG. 23 is a cross-sectional view of the touch sensor device illustrated in FIGS. 22 and 1 taken along the section line III-III'A-III"A-V.

Referring to FIGS. 22, and 23, the touch sensor device including the touch sensor according to the exemplary embodiment is substantially the same as the touch sensor device according to the exemplary embodiment illustrated in FIGS. 18 and 19, except the position of the first and second touch electrodes 410 and 420 and the position of the first connection part 412 may be changed.

More specifically referring to FIGS. 1, 22, and 23, the first and second touch wires 411 and 421 including the pad part 450 and the first conductive pattern including the first connection part 412 are positioned on the substrate 113. At least one of the first and second touch wires 411 and 421 and the first connection part 412 may include a conductive layer formed of a single layer or a multilayer. For example, as illustrated in FIG. 23, the first connection part 412 may include a first conductive layer 412*e* and a second conductive layer 412*f* positioned on the first conductive layer 412*e*, the first touch wires 411 may include a first conductive layer 411*e* and a second conductive layer 411*f* positioned on the first conductive layer 411*e*, the second touch wires 421 (not shown) may include a first conductive layer 421*e* (not shown) and a second conductive layer 421*f* (not shown) positioned on the first conductive layer 421*e*, and the pad part 450 may include a first conductive layer 450*e* and a second conductive layer 450*f* positioned on the first conductive layer 450*e*.

The first conductive layers 412*e*, 411*e*, 421*e*, and 450*e* may include low resistance materials such as metals (i.e., molybdenum (Mo), silver (Ag), titanium (Ti), copper (Cu), palladium (Pd), aluminum (Al), molybdenum/aluminum/molybdenum (Mo/Al/Mo), or metal alloys (i.e., silver palladium copper (APC)), but are not limited to such materials.

The second conductive layers 412*f*, 411*f*, 421*f*, and 450*f* may include low resistance materials different from those of the first conductive layers 412*e*, 411*e*, 421*e*, and 450*e* may include conductive oxides (i.e., indium tin oxide (ITO) and indium zinc oxide (IZO), but are not limited to such materials.

The lower polymer layer 430 may be positioned over the entire surface of the first connection part 412 and the exposed substrate 113. The lower polymer layer 430 may be continuously formed on the substrate 113 and may be divided into a conductive region having conductivity and a non-conductive region having non-conductivity. The conductive region and the non-conductive region both are positioned on the lower polymer layer 430 as the same layer. The thickness of the conductive region of the lower polymer layer 430 may be substantially equal to the non-conducive area but is not necessarily limited to such an embodiment.

The non-conductive region of the lower polymer layer 430 may include the first insulating area 430*b* and a portion covering the first and second touch wires 411 and 421 other than the pad part 450. The first insulating area 430*b* may cover the first connection part 412 and the peripheral area of the first connection part. The first insulating area 430*b* may insulate between the first connection part 412 and the second connection part 422 in the touch sensing area TA. The first insulating area 430*b* may expose both ends of the first connection part 412.

The conductive region of the lower polymer layer 430 may include first conductive regions 431*g* that contact both exposed ends of the first connection part 412 (i.e., portions of the first connection part that are not covered with the first insulating area 430*b*) and are electrically connected to each other. The conductive regions of the lower polymer layer 430 may also include third conductive regions 435*g* that contact an upper surface of the second conductive layer 450*f* of the pad part 450 and are electrically connected to each other.

The first conductive region 431*g* may also be formed in region where the first touch electrode 410 will be formed and may substantially equal the area the first touch electrode 410 will be formed. The conductive region of the lower polymer layer 430 may further include the second conductive region (not illustrated) which may be formed in at least a portion of the area in which the second touch electrode 420 will be formed.

The third conductive region 435*g* may be positioned only on the second conductive layers 450*f* of each pad part 450.

FIG. 23 illustrate that an edge of the third conductive region 435*g* of the lower polymer layer 430 may be aligned with an edge of the pad part 450. However, an exemplary embodiment includes the third conductive region 435*g* having an edge extending beyond the edge of the pad part. An exemplary embodiment also includes the third conductive region 435*g* having an edge ending prior to the edge of the pad part 450 (i.e., the edge of the pad part 450 extends beyond the edge of the third conductive region 435*g*). When the edge of the pad part 450 extends beyond the edge of the third conductive region 435*g*, the non-conductive region of the lower polymer layer 430 may also cover a portion of the upper surface of the pad part 450.

The upper polymer layer 460 may be positioned over the entire surface of the lower polymer layer 430. The upper polymer layer 460 may be continuously formed on the substrate 113 and may be divided into a conductive region having conductivity and a non-conductive region having non-conductivity. In other words, the conductive region and the non-conductive region both are positioned on the upper polymer layer 460 as the same layer.

The conductive region of the upper polymer layer 460 may include the first and second touch electrodes 410 and 420, the second connection part 422 connecting two adjacent second touch electrodes 420 to each other, and a fourth conductive region 465*h* that is positioned on the third conductive region 435*g* on the second conductive layer 450*f* of the pad part 450.

The second connection part 422 may be physically and electrically connected to two adjacent second touch electrodes 420. The second connection part 422 may be positioned on the first insulating area 430*b* of the lower polymer layer 430 and may be insulated from the first connection part 412.

The first touch electrode 410 may contact the first conductive region 431*g* of the lower polymer layer 430 to be electrically connected to the first conductive region 431*g*. Therefore, the first touch electrode 410 may be electrically connected to an adjacent first touch electrode 410 by the first connection part 412 connected to the first conductive region 431*g*.

Effects generated by including other several features, such as a plane structure of the first and second touch electrodes 410 and 420, the first connection part 412, the second connection part 422, the first and second touch wires 411 and 421, and the pad part 450, and the polymer layer are the same as those of the exemplary embodiments described above and therefore will be omitted for brevity.

The material of the lower and upper polymer layers 430 and 460 are the same as one described above.

Unlike the exemplary embodiments described so far, the first connection part 412 connecting two adjacent first touch electrodes 410 may be positioned in the same layer as the first touch electrode 410 and may be integrated with the first touch electrode 410 and the second connection part 422 connecting two adjacent second touch electrodes 420 to each other may be positioned on a different layer from the second touch electrode 420. In this case, the features of the second connection part 422 and the structure connected to the second connection part 422 may be identically applied to the features of the first connection part 412 described above.

Next, a manufacturing method of a touch sensor device according to an exemplary embodiment will be described with reference to FIGS. 24, 25, 26, 27, 28, 29, and 30, along with the above-mentioned FIGS. 22 and 23.

Figure 24:
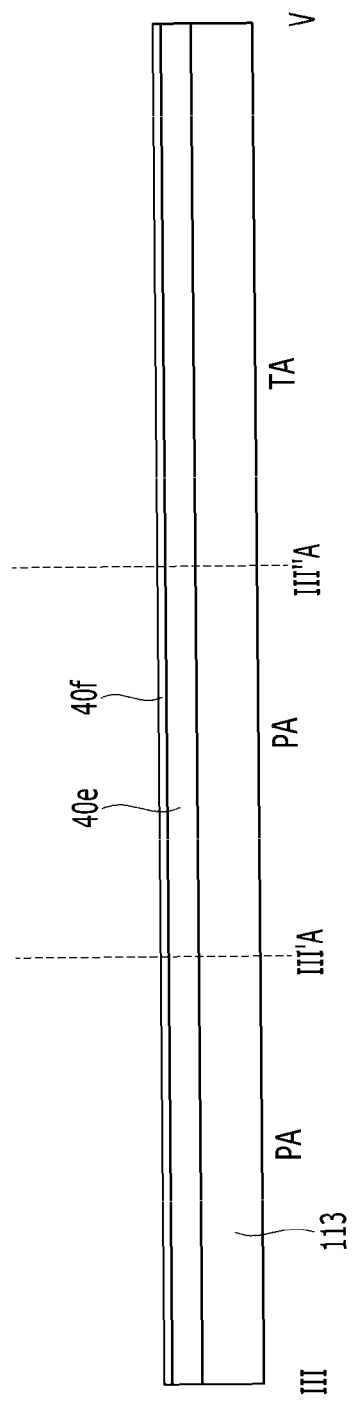

First, referring to FIG. 24, the substrate 113 including glass or plastic may be prepared and a first conductive layer 40*e* may be formed by stacking the conductive materials such as the low resistance materials such as metals (i.e., molybdenum (Mo), silver (Ag), titanium (Ti), copper (Cu), palladium (Pd), aluminum (Al), molybdenum/aluminum/molybdenum (Mo/Al/Mo)), or metal alloys silver palladium copper (APC), on the substrate 113. Next, a second conductive layer 40f may be formed by stacking the low resistance materials different from those of the first conductive layer 40e or conductive materials such as conductive oxides (i.e., indium tin oxide (ITO) or indium zinc oxide (IZO)) on the first conductive layer 40e.

Figure 25:
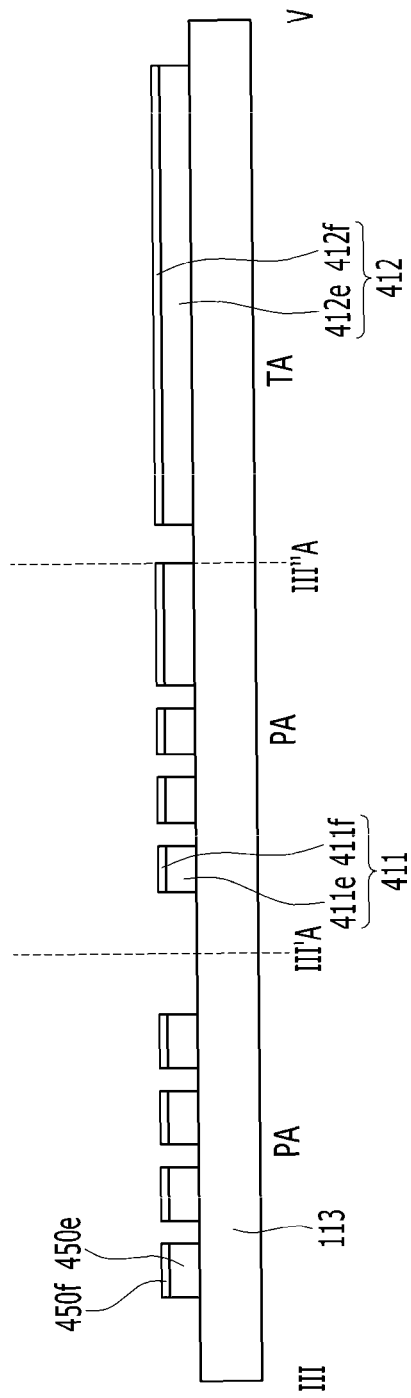

Next, referring to FIG. 25, the first conductive layer 40e and the second conductive layer 40f are patterned by the photolithography process to form the first conductive layer 450e and the second conductive layer 450f of the pad part 450, complete the first touch wires 411 including the first conductive layer 411e and the second conductive layer 411f, complete the second touch wires 421 (not shown) including the first conductive layer 421e and the second conductive layer 421f, and complete the first connection part 412 including the first conductive layer 412e and the second conductive layer 412f.

Figure 26:
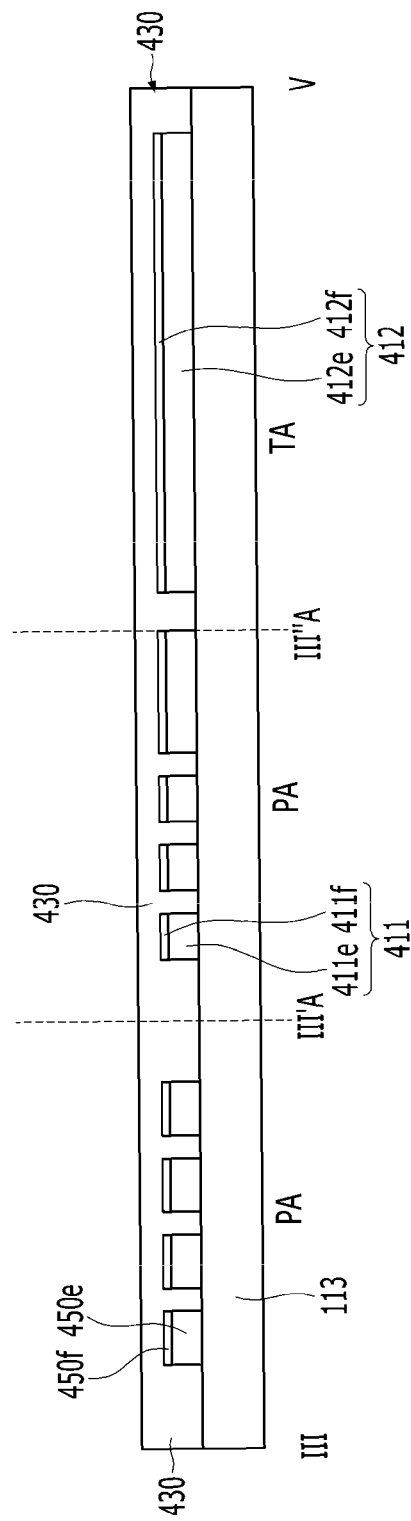

Next, referring to FIG. 26, the conductive polymer materials (i.e., polyacetylene (PA), polyaniline (PANI), polythiophene (PT), polypyrrole (PPy), polyphenylenevinylene (PPV), and poly (3,4-ethylenedioxythiopene) (PEDOT)) may be applied on the entire surface of the substrate 113 to form the lower polymer layer 430.

Figure 27:
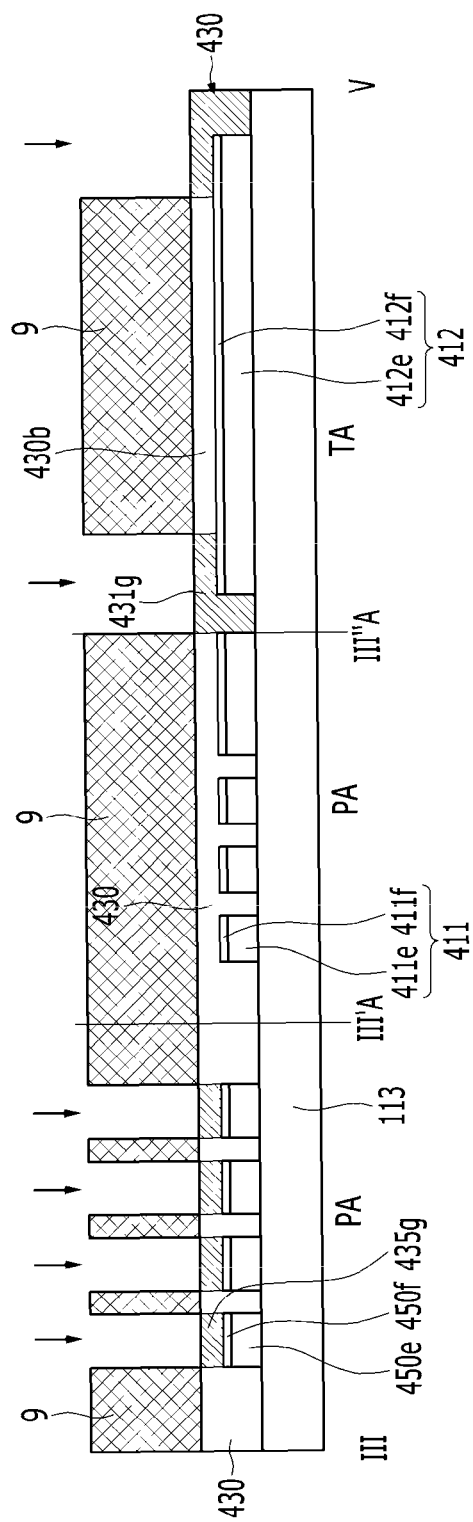

Next, referring to FIG. 27, the photoresist may be applied on the lower polymer layer 430 and may be exposed and developed to form a mask pattern 9 for creating the non-conductive region in the lower polymer layer 430.

Next, the lower polymer layer 430 which is not covered with the mask pattern 9 may be oxidized by the oxidizing agents (i.e., ceric ammonium nitrate (CAN) and sodium hypochlorite (NaOCl)) to remove the conductivity.

Figure 28:
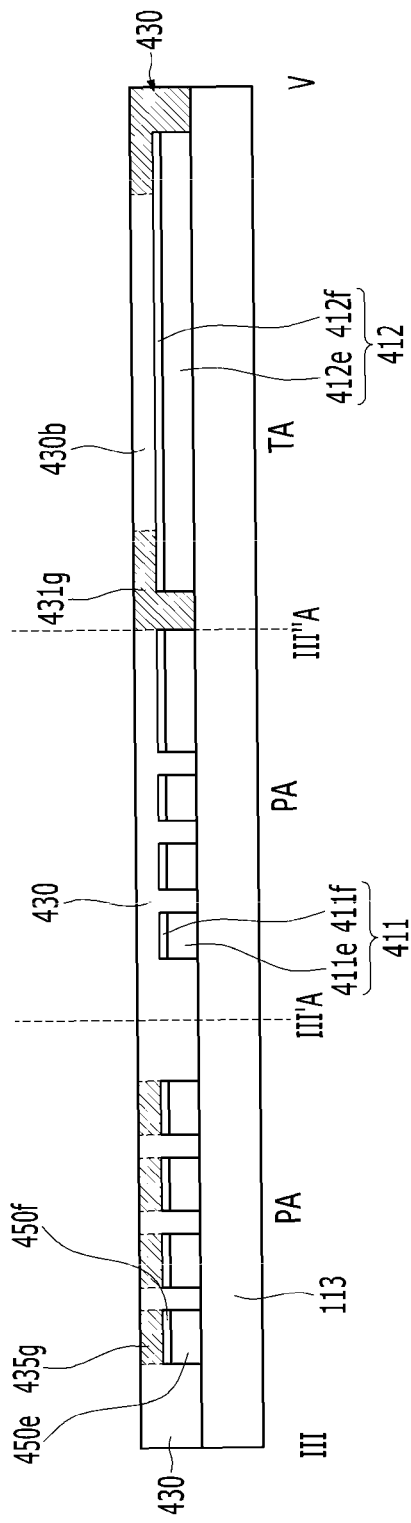

Next, referring to FIG. 28, the mask pattern 9 may be removed.

Therefore, the lower polymer layer 430 including the first insulating area 430b, the non-conductive region including a portion covering the first and second touch wires 411 and 421 other than the pad part 450, and the conductive region including the first conductive region 431g and the third conductive region 435g is complete.

Figure 29:
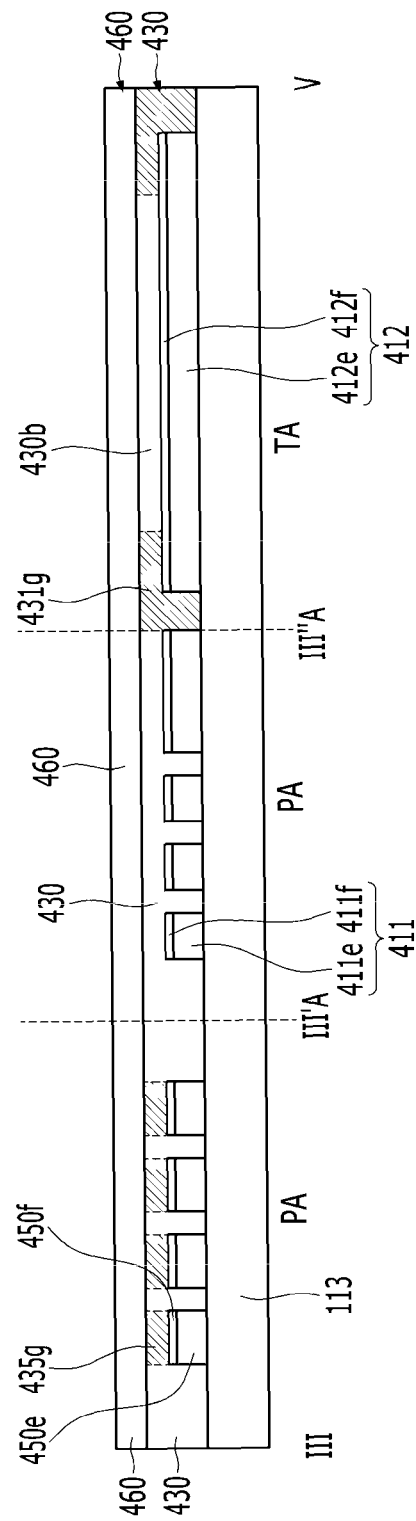

Next, referring to FIG. 29, the conductive polymer materials (i.e., polyacetylene (PA), polyaniline (PANI), polythiophene (PT), polypyrrole (PPy), polyphenylenevinylene (PPV), and poly (3,4-ethylenedioxythiopene) (PEDOT)) may be applied on the entire surface of the substrate 113 to form the upper polymer layer 460.

Next, referring to FIG. 30, the photoresist may be applied on the upper polymer layer 460 and may be exposed and developed to form a mask pattern 99 for creating the non-conductive region in the upper polymer layer 460.

Next, the upper polymer layer 460 that is not covered with the mask pattern 99 may be oxidized by the oxidizing agents (i.e., ceric ammonium nitrate (CAN) and sodium hypochlorite (NaOCl)) to remove the conductivity.

Next, the mask pattern 99 may be removed. Thus, the upper polymer layer 460 including the conductive region and the non-conductive region described above is completed.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch sensor device, comprising:
a first conductive pattern disposed on a substrate;
a first polymer layer disposed on the first conductive pattern, the first polymer layer comprising a first conductive region and a first non-conductive region;
a second polymer layer directly disposed on the first polymer layer, the second polymer layer comprising a second conductive region and a second non-conductive region;
wherein a portion of the first conductive region contacts a portion of the second conductive region.

2. The touch sensor device of claim 1, wherein:
the first polymer layer and the second polymer layer each are formed over an entire surface of the substrate.

3. The touch sensor device of claim 2, wherein:
a thickness of each of the first conductive region and the first non-conductive region are substantially the same and a thickness of each of the second conductive region and the second non-conductive region are substantially the same.

4. The touch sensor device of claim 1, wherein:
the first conductive pattern comprises first touch electrodes and second touch electrodes, and
the second conductive region of the second polymer layer comprises a first connection part that electrically connects two adjacent first touch electrodes.

5. The touch sensor device of claim 4, wherein:
the first conductive region of the first polymer layer comprises a portion that is connected to a portion of the first touch electrodes and the first connection part.

6. The touch sensor device of claim 5, wherein:
the second conductive region of the second polymer layer comprises a portion that is connected to the first connection part and disposed on the first touch electrodes, and a portion that is insulated from the first connection part and disposed on the second touch electrodes.

7. The touch sensor device of claim 6, wherein:
a portion of the second conductive region of the second polymer layer that is disposed on the first touch electrodes and the second touch electrodes has a mesh type.

8. The touch sensor device of claim 5, further comprising:
a second connection part connecting two adjacent second touch electrodes,
wherein the first connection part and the second connection part are insulated from each other by the first non-conductive region of the first polymer layer.

9. The touch sensor device of claim 5, wherein:
the first conductive region of the first polymer layer comprises a portion that is disposed on the first touch electrodes.

10. The touch sensor device of claim 4, further comprising:
a first touch wire connected to the first touch electrodes; and
a second touch wire connected to the second touch electrodes,
wherein the first non-conductive region of the first polymer layer comprises a portion covering the first touch wire and the second touch wire, and
the first conductive region of the first polymer layer is disposed on a pad part of the first and second touch wires.

11. The touch sensor device of claim 10, wherein:
the first conductive region of the second polymer layer comprises a portion that is disposed on the pad part.

12. The touch sensor device of claim 1, wherein:
the first conductive pattern comprises touch wires and first connection parts.

13. The touch sensor device of claim 12, wherein:
the second conductive region of the second polymer layer comprises first touch electrodes, second touch electrodes, and a second connection part connecting two adjacent second touch electrodes.

14. The touch sensor device of claim 13, wherein:
the first conductive region of the first polymer layer comprises a portion that is connected to first touch electrodes and the first connection parts.

15. The touch sensor device of claim 14, wherein:
the first connection parts and the second connection part are insulated from each other by the first non-conductive region of the first polymer layer.

16. A manufacturing method of a touch sensor device, comprising:
stacking and patterning a conductive layer on a substrate to form a first conductive pattern;
applying a first polymer material on an entire surface of the first conductive pattern to form a first polymer layer;
disposing a first mask pattern on a portion of the first polymer layer;
oxidizing the portion of the first polymer layer not covered by the first mask pattern to form a first non-conductive region in the portion of the first polymer layer not covered by the first mask pattern and a first conductive region in the portion covered by the first mask pattern;
applying a second polymer material directly on an entire surface of the first polymer layer to form a second polymer layer;
disposing a second mask pattern on a portion of the second polymer layer; and
oxidizing the portion of the second polymer layer not covered by the second mask pattern to form a second non-conductive region in the portion of the second polymer layer not covered by the second mask pattern and a second conductive region covered by the second mask pattern,
wherein a portion of the first conductive region contacts a portion of the second conductive region.

17. The manufacturing method of claim 16, wherein:
the forming of the first conductive pattern comprises disposing first touch electrodes and second touch electrodes on the substrate, and first and second touch wires connected to the first and second touch electrodes; and
the second conductive region of the second polymer layer comprises a first connection part that electrically connects two adjacent first touch electrodes.

18. The manufacturing method of claim 17, wherein:
the first conductive region of the first polymer layer comprises a portion that is connected to the first touch electrodes and the first connection part.

19. The manufacturing method of claim 16, wherein:
the forming of the first conductive pattern comprises disposing touch wires and first connection parts.

20. The manufacturing method of claim 19, wherein:
the second conductive region of the second polymer layer comprises first touch electrodes, second touch electrodes, and a second connection part connecting two adjacent second touch electrodes.

* * * * *